United States Patent
Potnis et al.

(10) Patent No.: US 6,216,483 B1
(45) Date of Patent: Apr. 17, 2001

(54) LIQUID DESICCANT AIR CONDITIONER

(75) Inventors: Shailesh V. Potnis, Effingham; Kevin Gurley, Watson; Phillip T. McKittrick; Robert Baumann, both of Effingham, all of IL (US); Srikant Ram Rao, Newtown, PA (US); Robert L. Laurent, Jr., Martinsville, NJ (US)

(73) Assignee: Fedders Corporation, Liberty Corner, NJ (US)

( * ) Notice: Subject to any disclaimer, the term of this patent is extended or adjusted under 35 U.S.C. 154(b) by 0 days.

(21) Appl. No.: 09/131,287

(22) Filed: Aug. 7, 1998

Related U.S. Application Data

(63) Continuation-in-part of application No. 08/984,741, filed on Dec. 4, 1997, now Pat. No. 6,138,470.

(51) Int. Cl.[7] .............................. F25D 23/00; F25D 17/06
(52) U.S. Cl. .................................................. 62/271; 62/94
(58) Field of Search ........................... 62/94, 271, 238.3; 165/163, 166, 158

(56) References Cited

U.S. PATENT DOCUMENTS

| | | | |
|---|---|---|---|
| 3,850,227 | * | 11/1974 | Ford . |
| 4,205,529 | * | 6/1980 | Ko ............................................. 62/2 |
| 4,461,347 | * | 7/1984 | Layton et al. ........................ 165/133 |
| 4,898,233 | * | 2/1990 | Grehier et al. ........................ 165/166 |
| 4,939,906 | * | 7/1990 | Spatz et al. ............................... 62/94 |
| 4,987,750 | * | 1/1991 | Meckler .............................. 62/238.6 |
| 5,123,481 | * | 6/1992 | Albers et al. ......................... 165/111 |
| 5,297,398 | * | 3/1994 | Meckler .................................. 62/271 |
| 5,351,497 | * | 10/1994 | Lowenstein ............................. 62/94 |
| 5,729,999 | * | 3/1998 | Kuhlenschmidt et al. . |
| 5,758,508 | * | 6/1998 | Belding et al. .......................... 62/94 |

OTHER PUBLICATIONS

Frank Incropera and David DeWitt, Introduction To Heat Transfer, John Wiley & Sons, ISBN 0–471–30458–1 P. 544, 1996.*

* cited by examiner

Primary Examiner—Corrine McDermott
Assistant Examiner—Chen-Wen Jiang
(74) Attorney, Agent, or Firm—Welsh & Katz, Ltd.

(57) ABSTRACT

A liquid desiccant air conditioner includes an absorption air conditioner and a liquid desiccant dehumidifier. The dehumidifier includes a liquid desiccant absorber for absorbing moisture contained in ambient air entering the dehumidifier, a boiler for boiling dilute liquid desiccant from the absorber to evaporate moisture and reconstitute the dilute liquid desiccant into concentrated liquid desiccant. A first heat exchanger receives dilute liquid desiccant from the absorber and is operative to heat the dilute liquid desiccant prior to passage to a condenser that receives steam from the boiler and sensibly heats the dilute liquid desiccant therein without direct contact with air, thereby eliminating desiccant carryover from the condenser. A second heat exchanger is operable to transfer heat from concentrated liquid desiccant received from the boiler to preheated dilute liquid desiccant received from the condenser prior to entry into the boiler. The second heat exchanger also recovers waste heat from the boiler. A pump draws concentrated liquid desiccant through the heat exchangers into the absorber. A portion of the steam from the boiler is used to regenerate refrigerant in the absorption air conditioner.

46 Claims, 22 Drawing Sheets

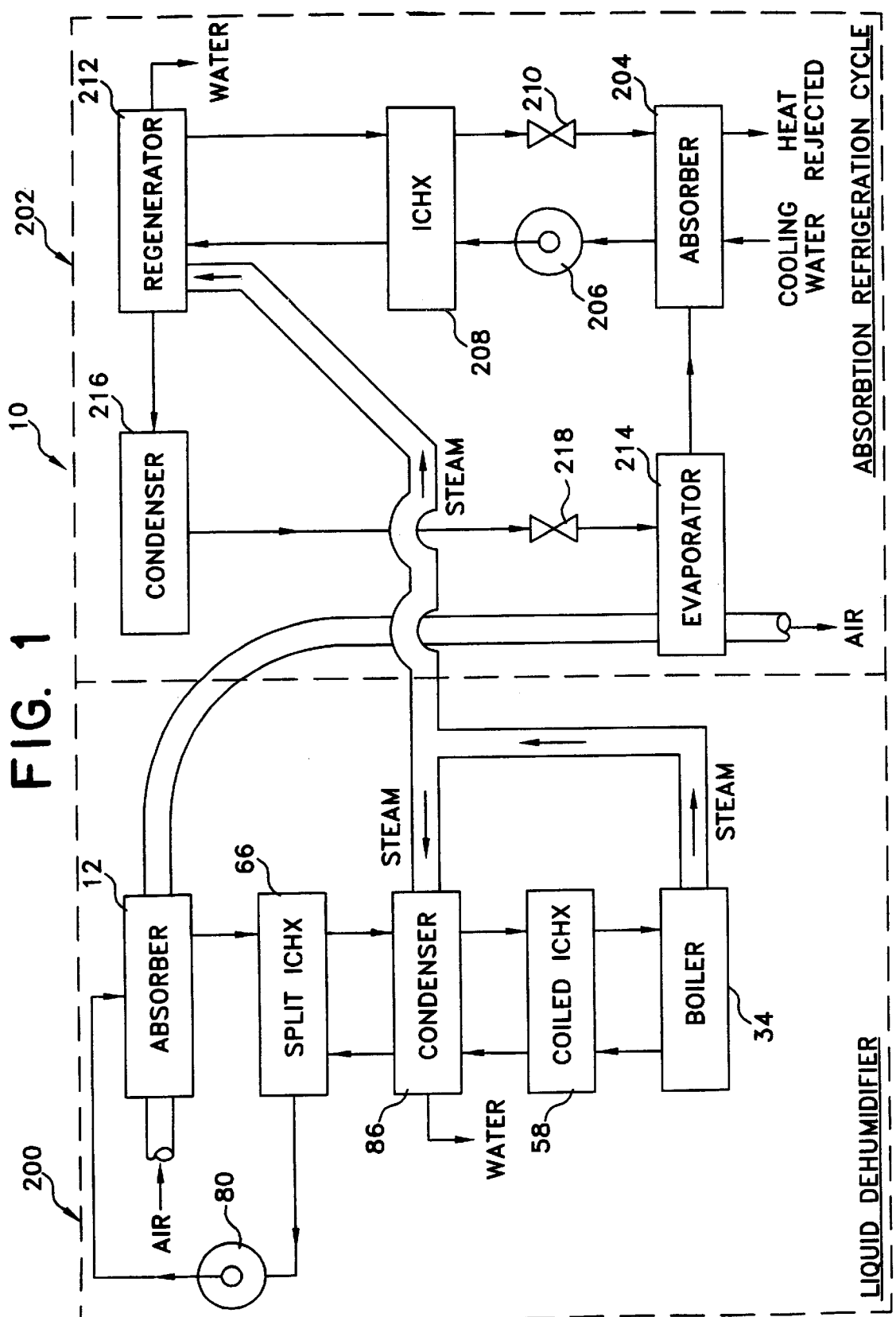

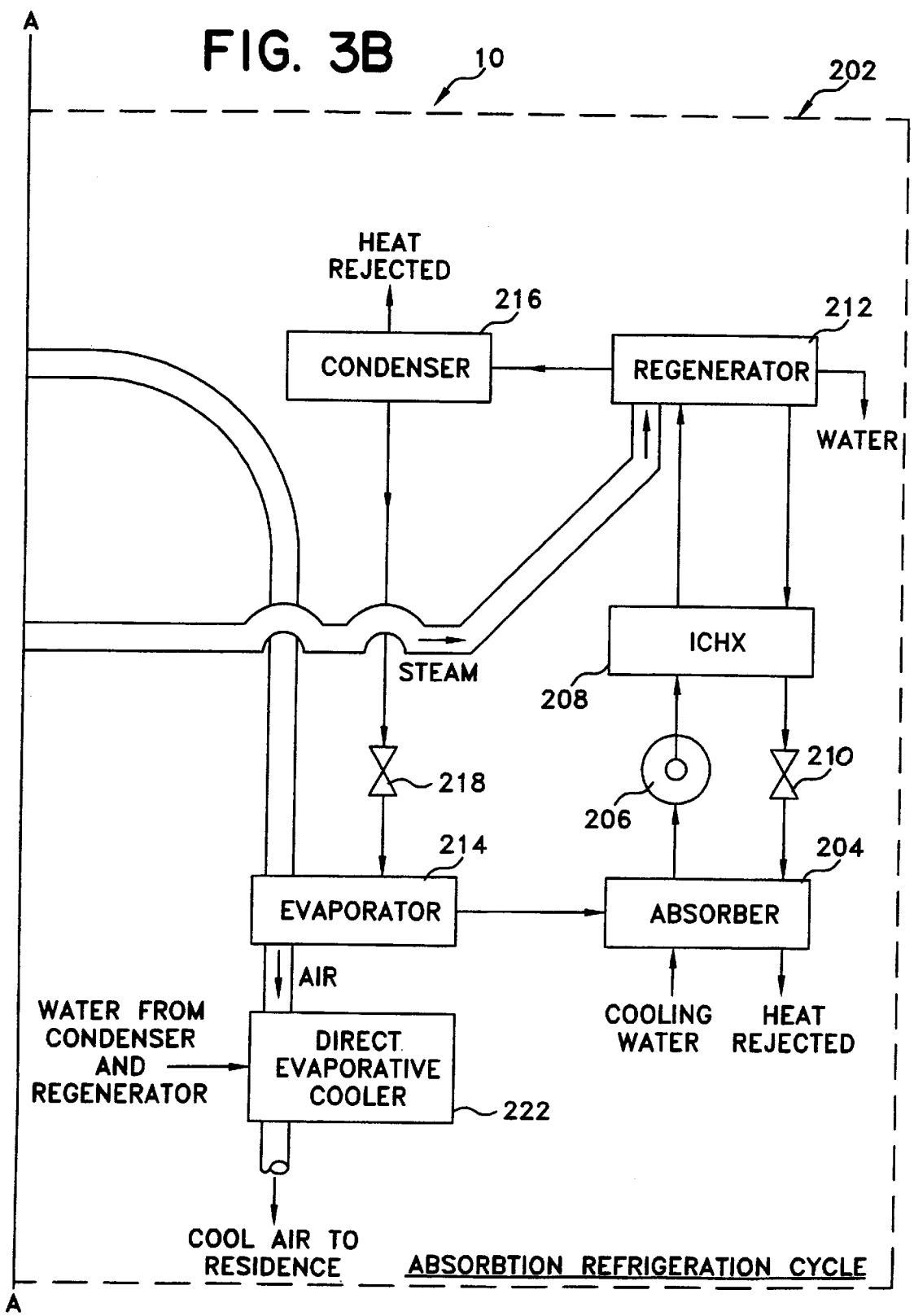

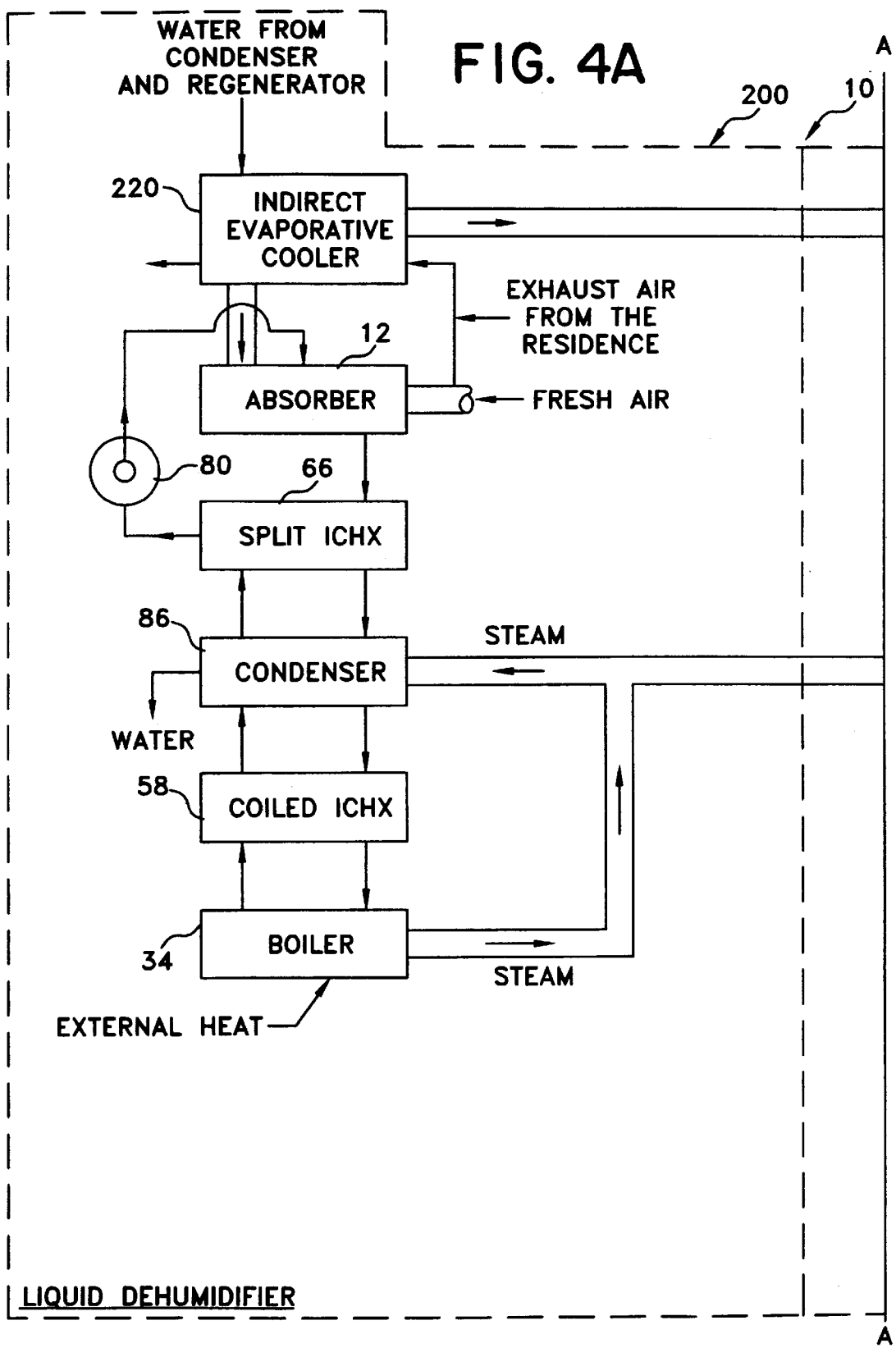

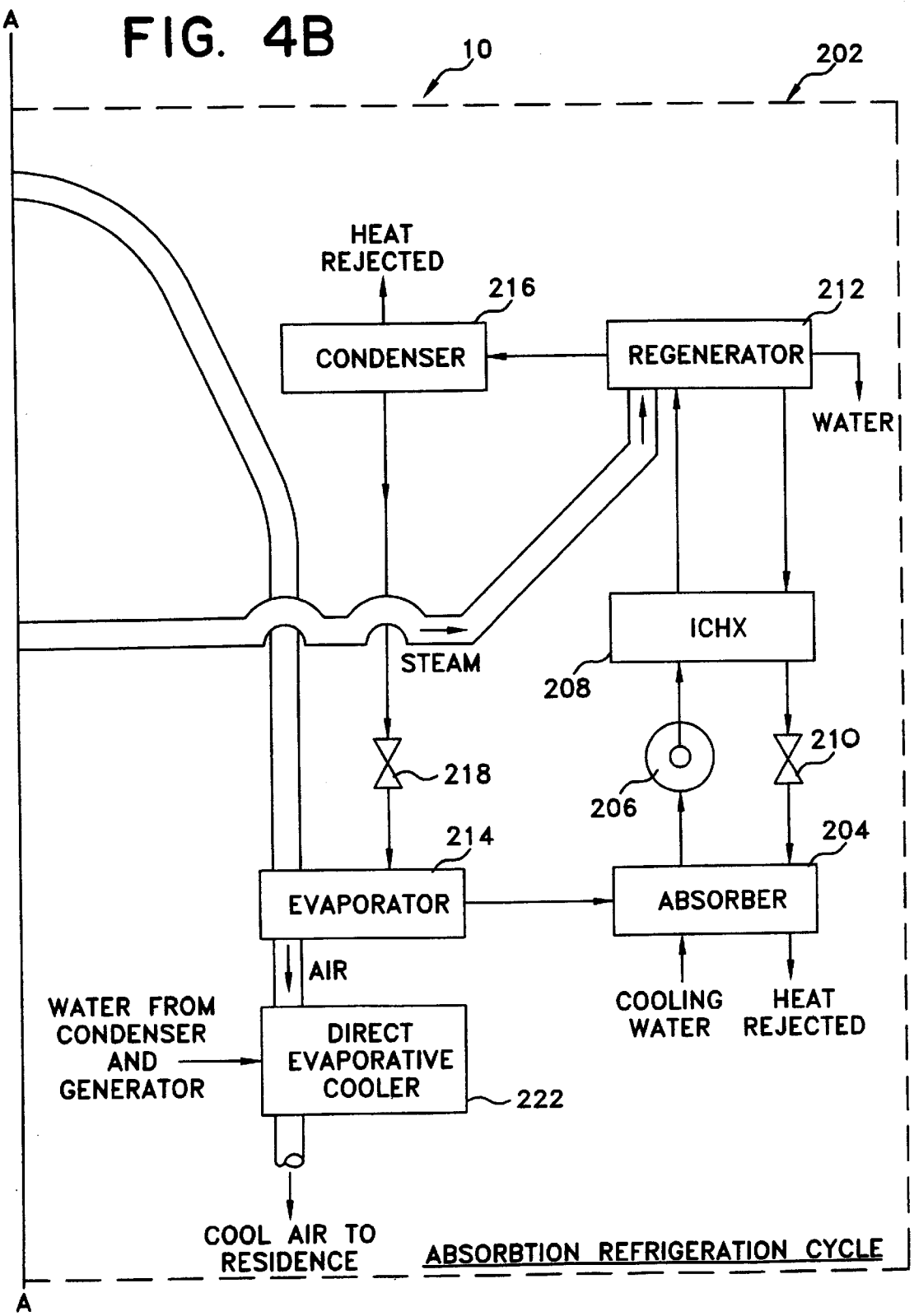

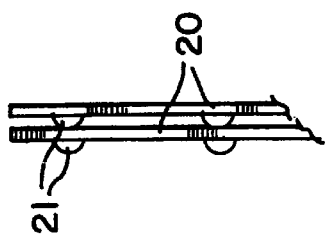
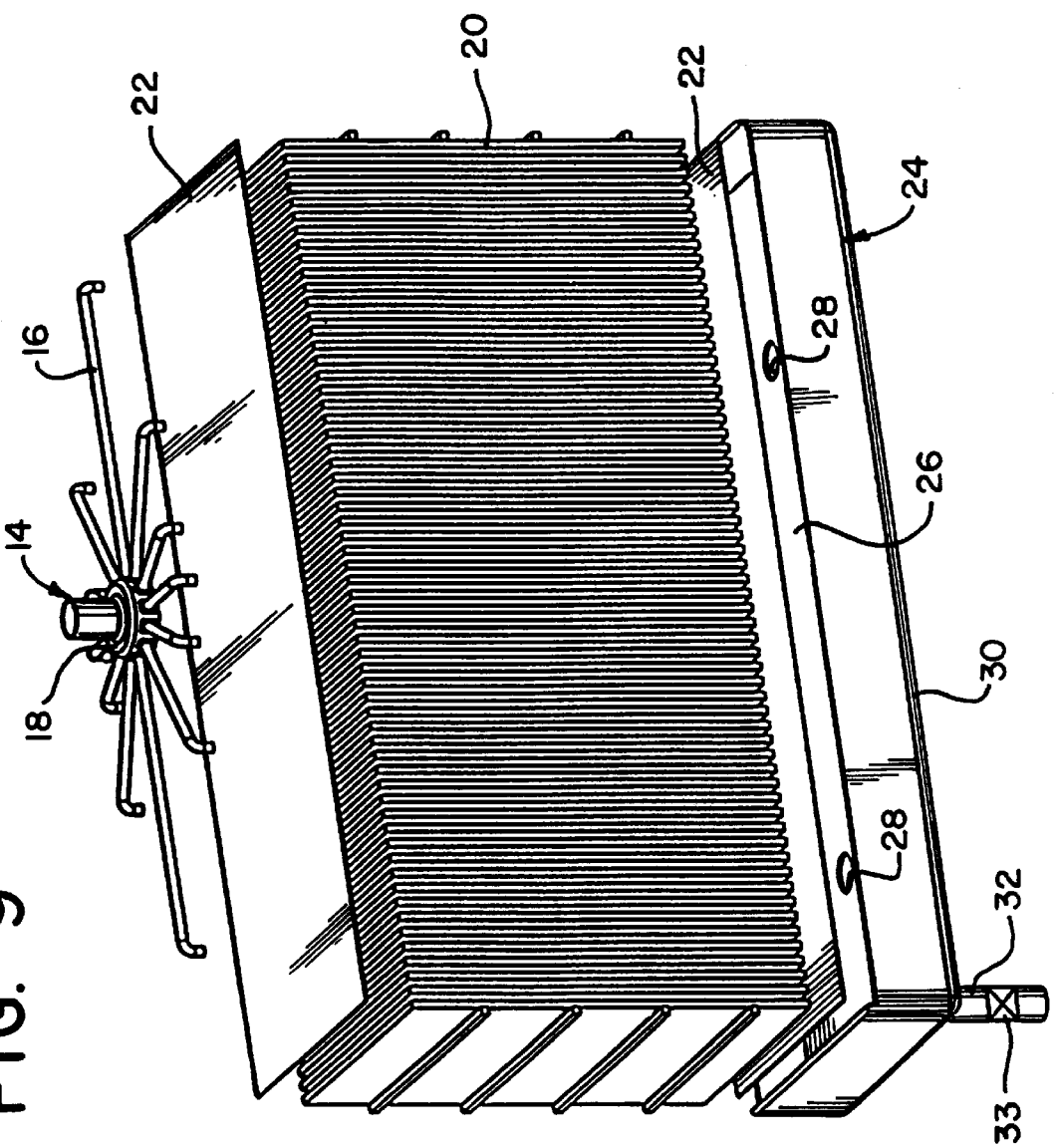

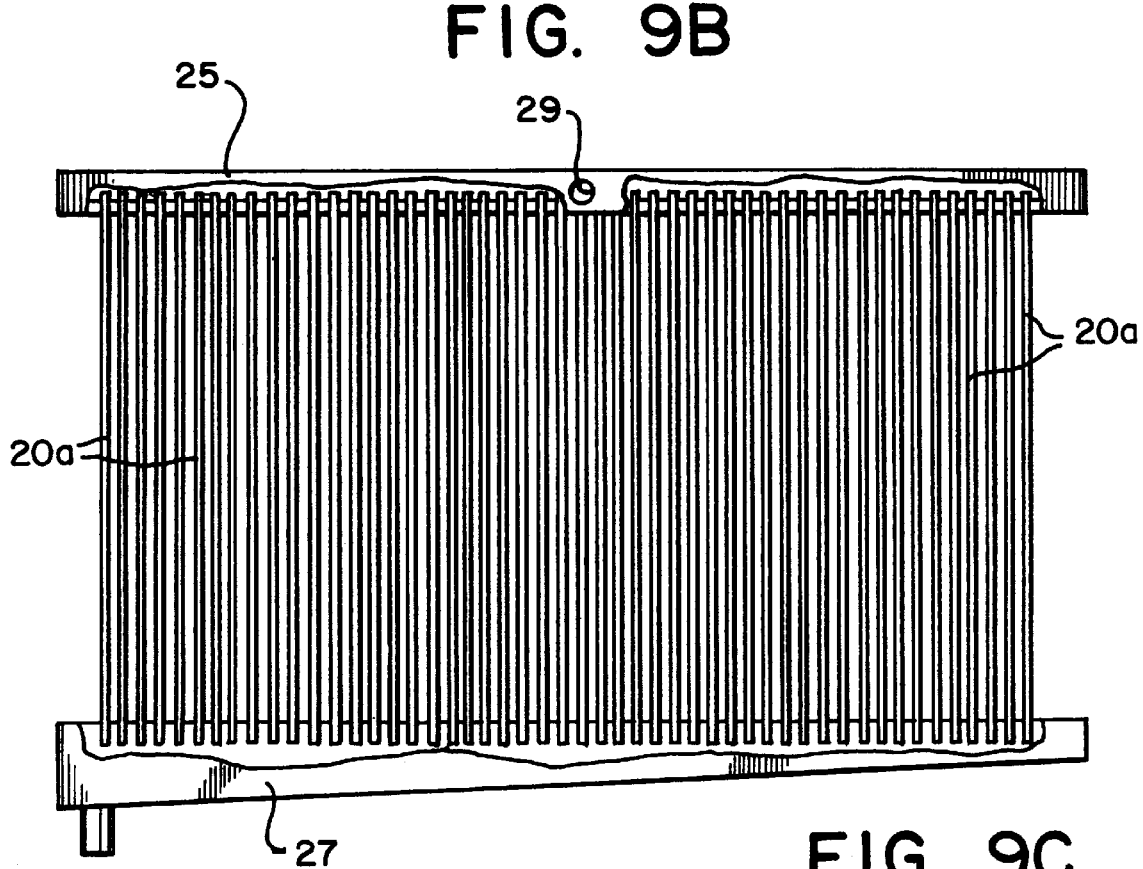
FIG. 9B
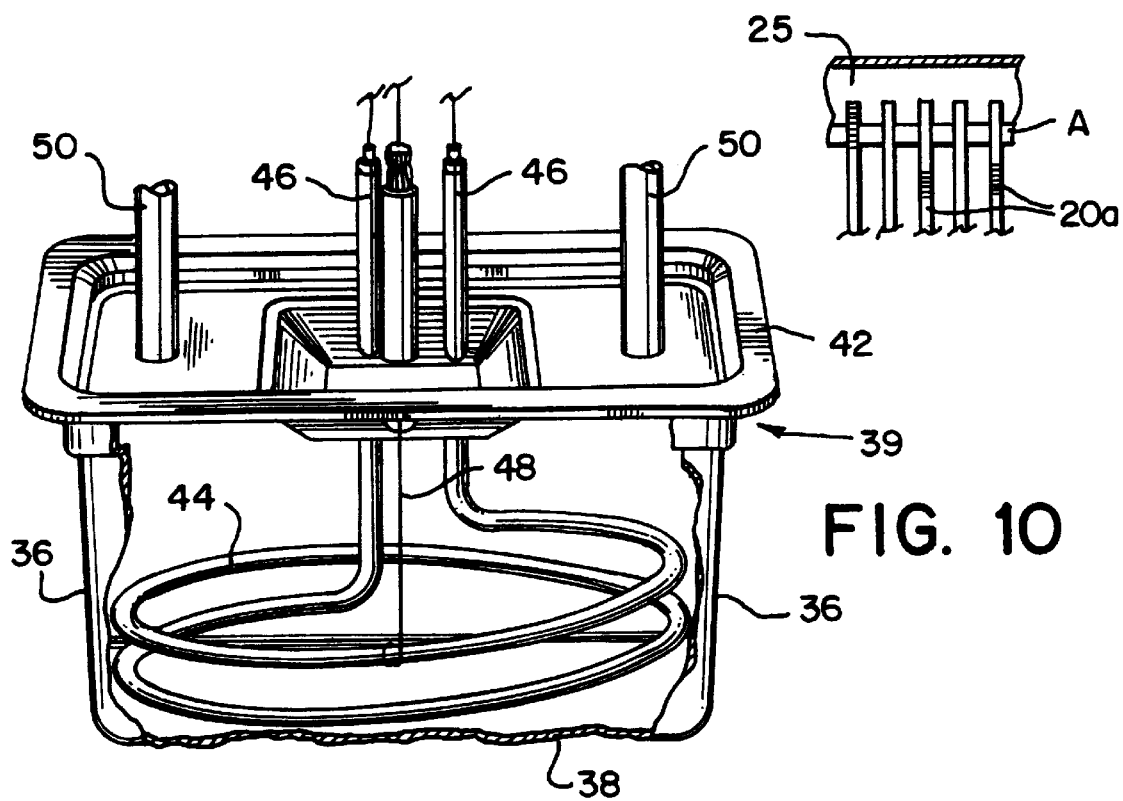
FIG. 9C
FIG. 10

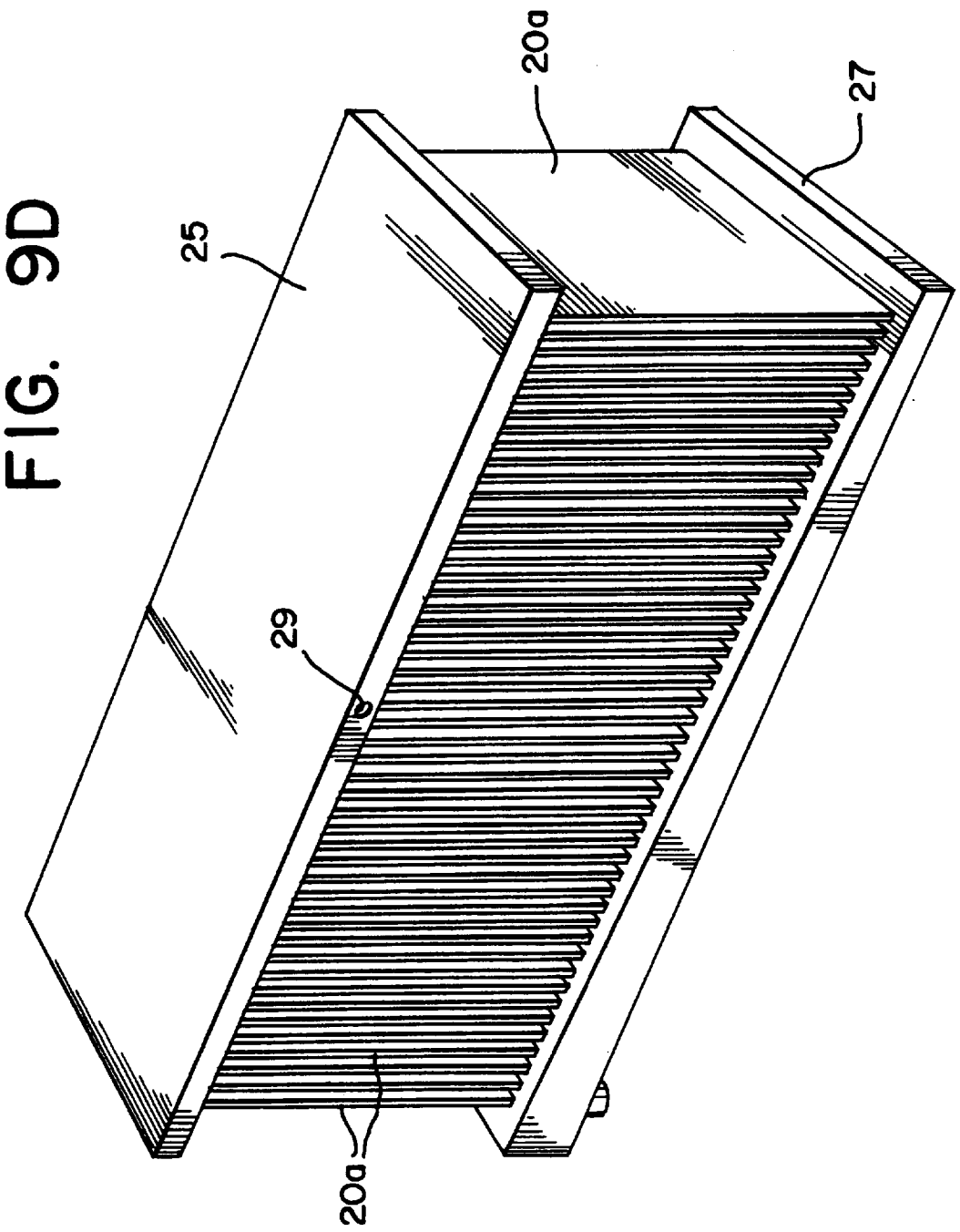

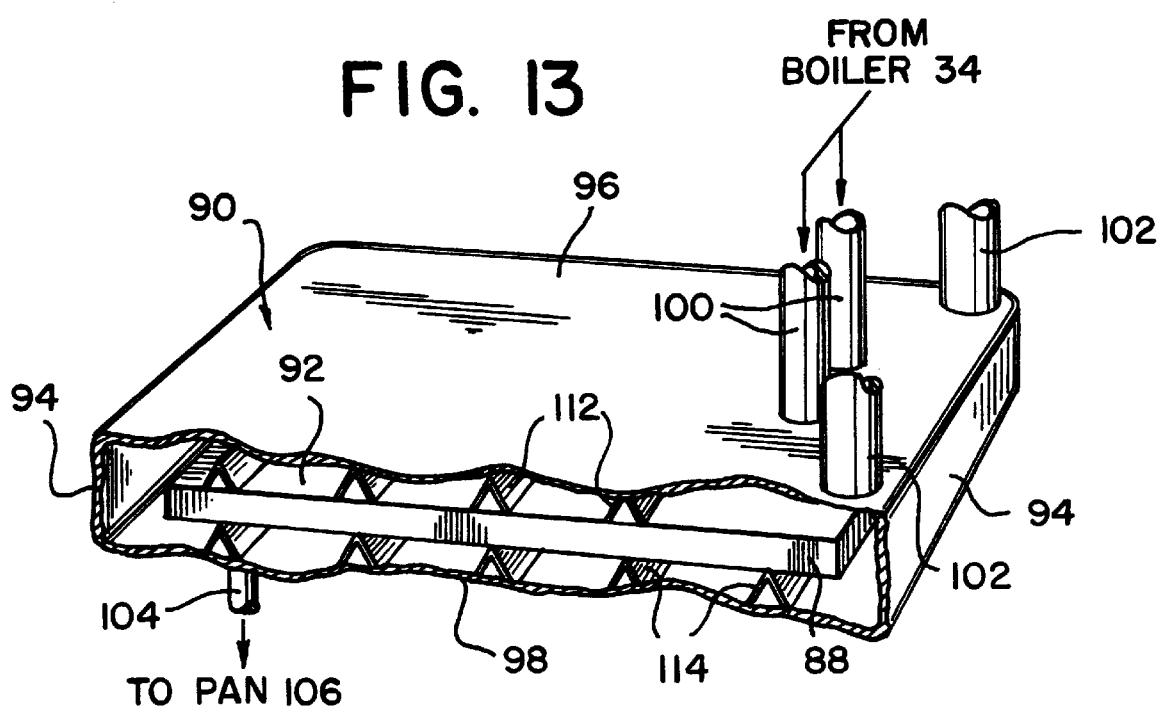
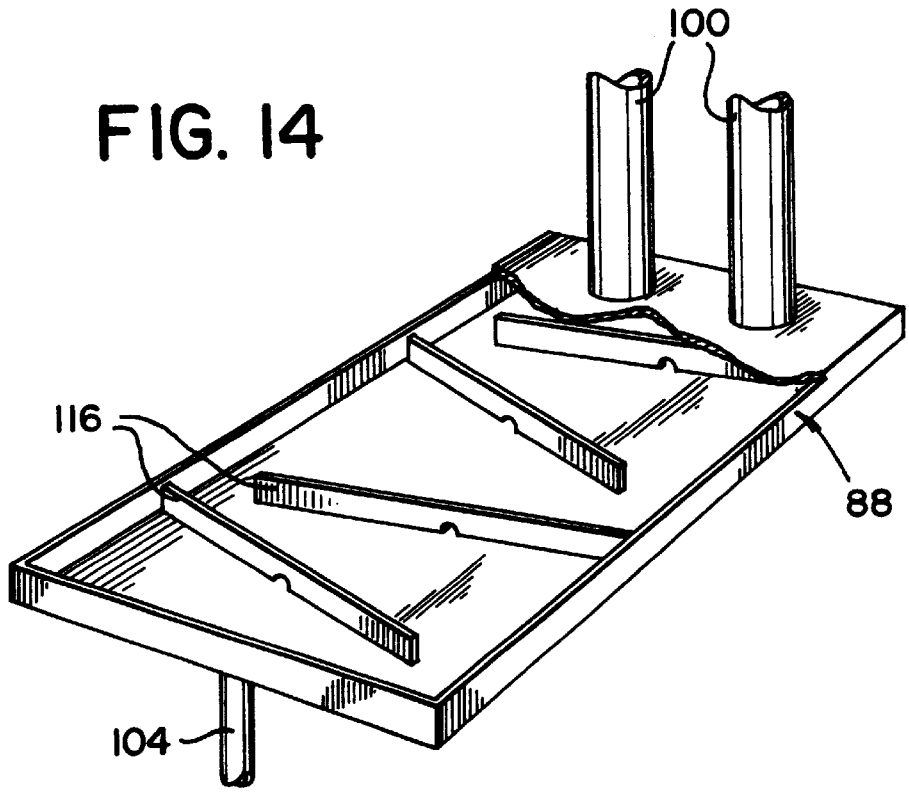

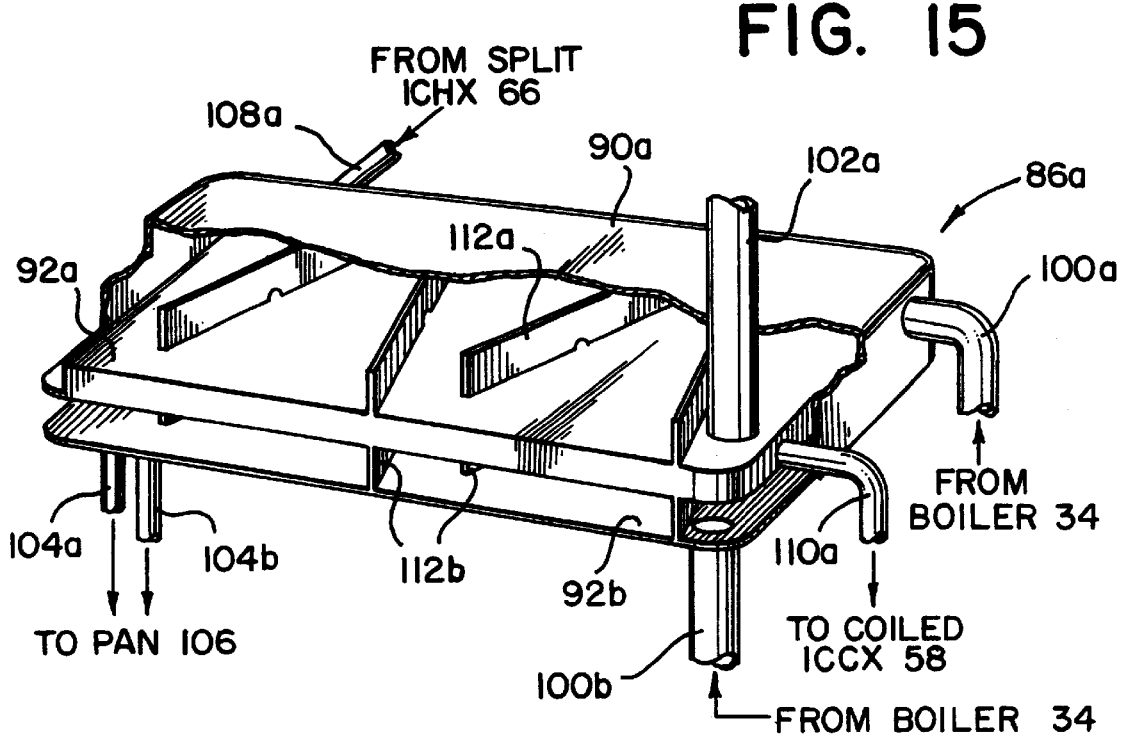
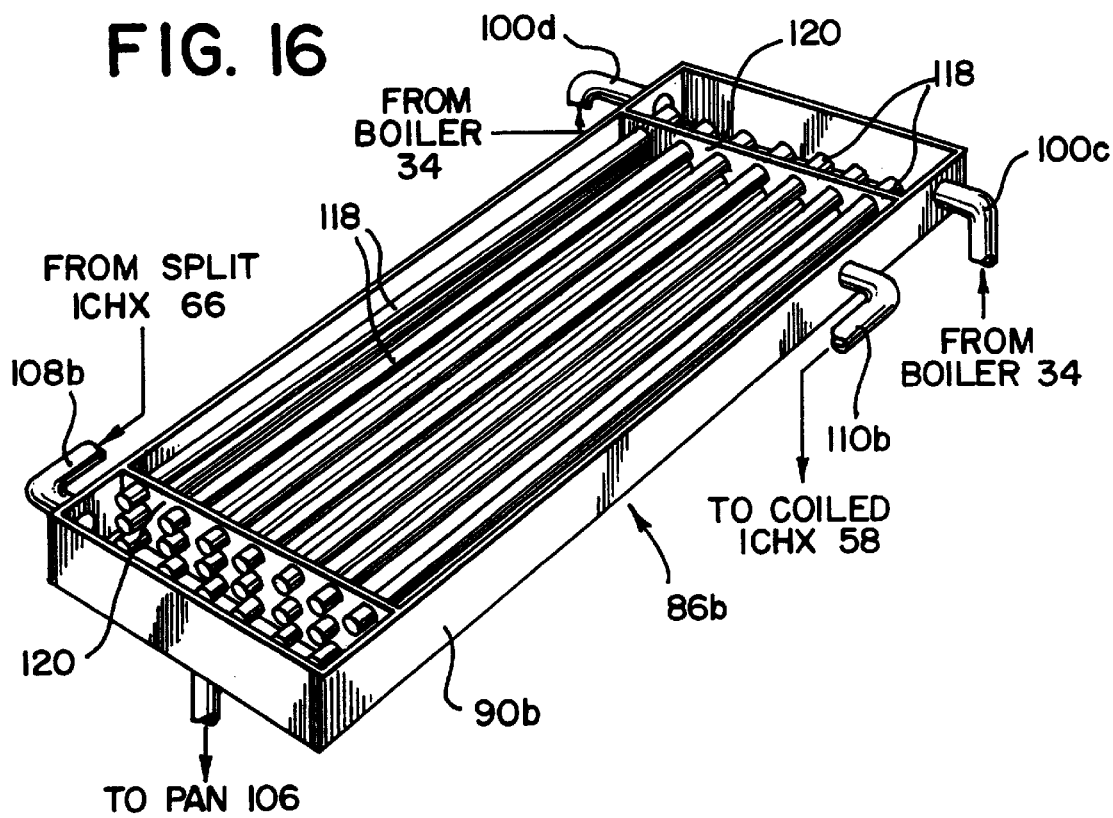

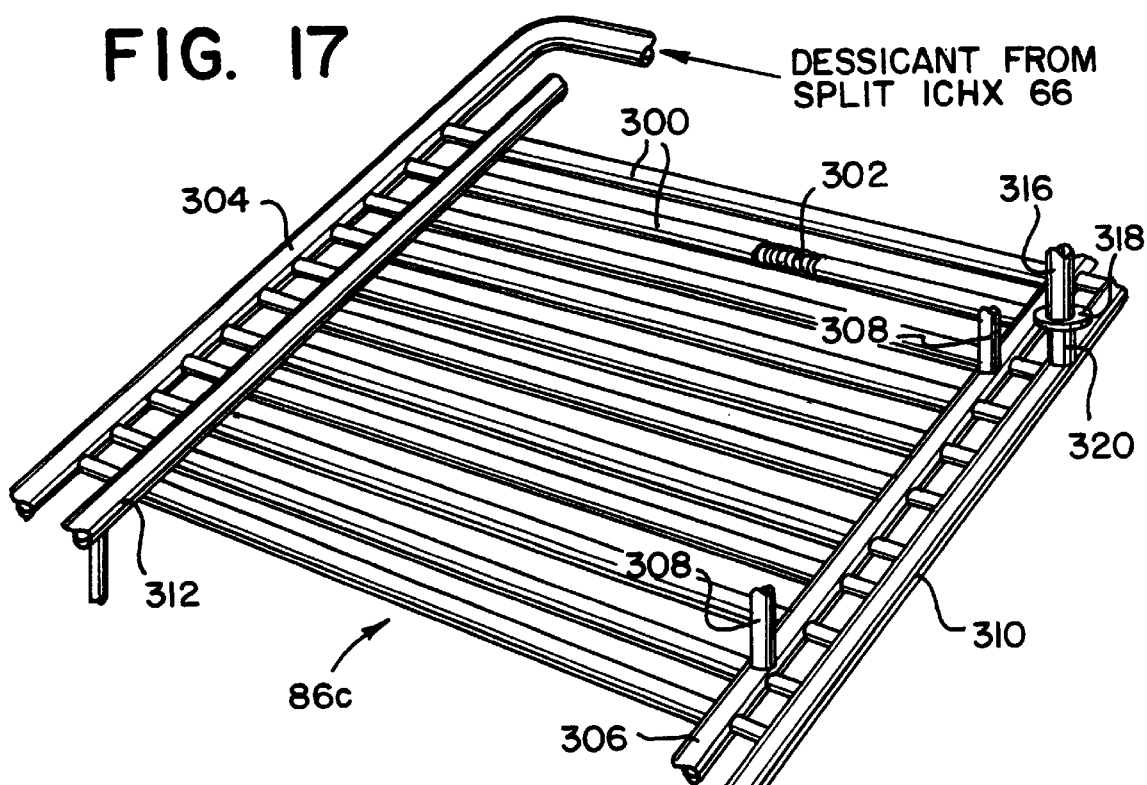
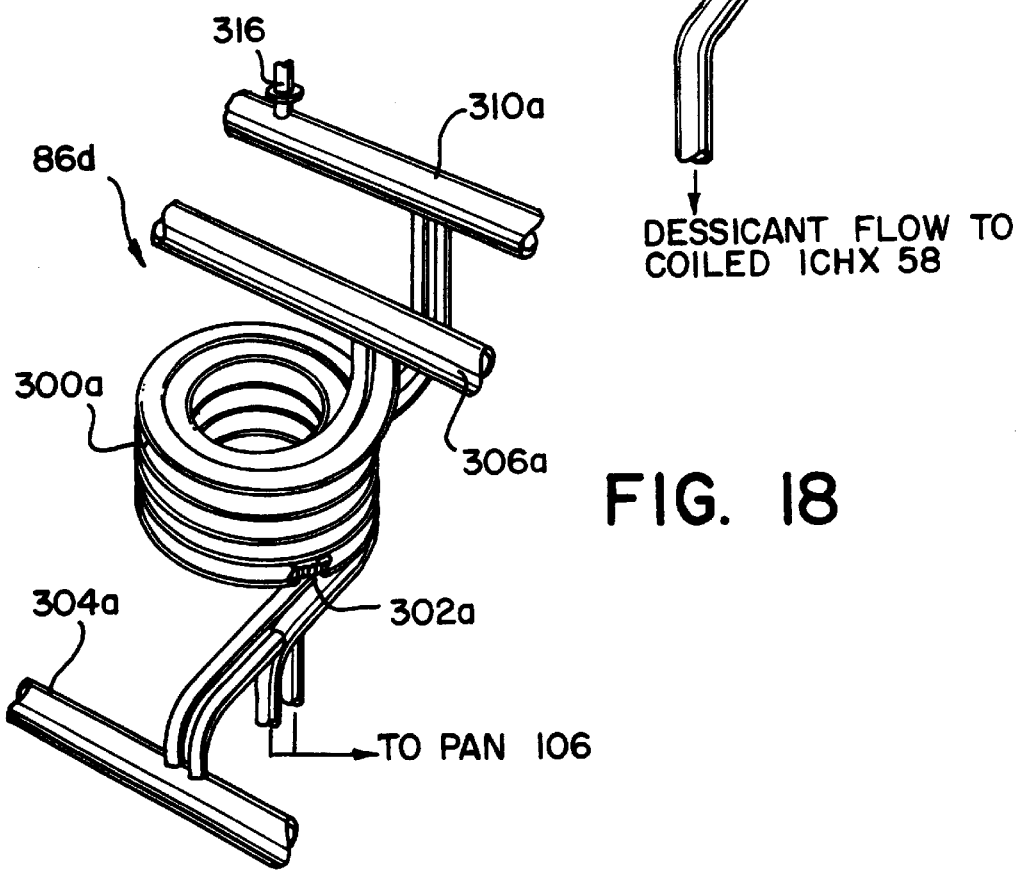

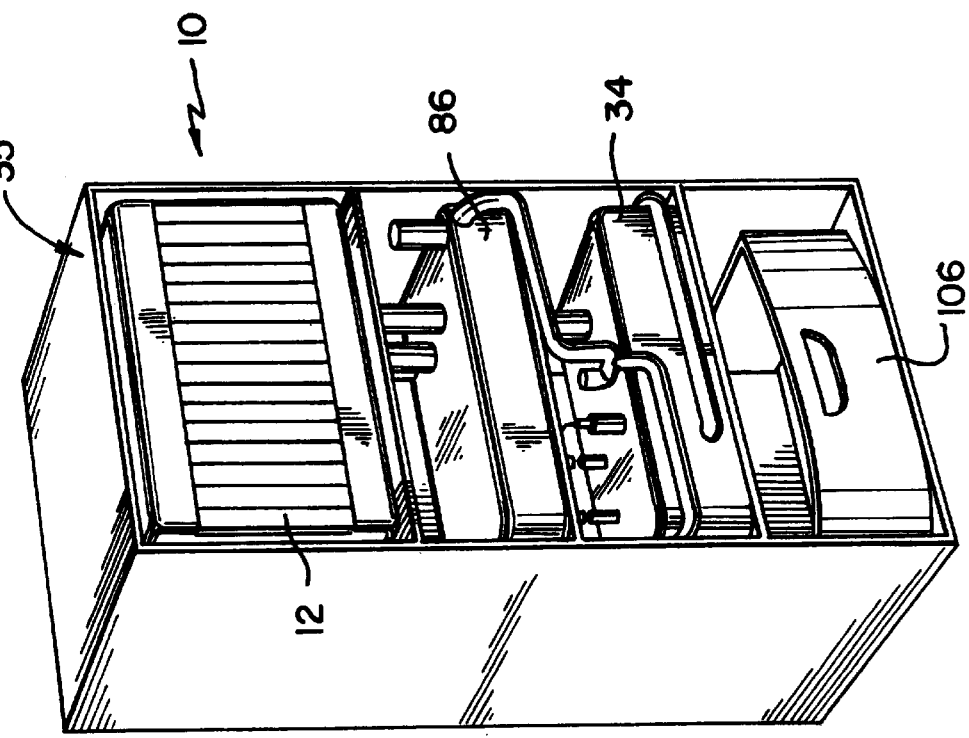
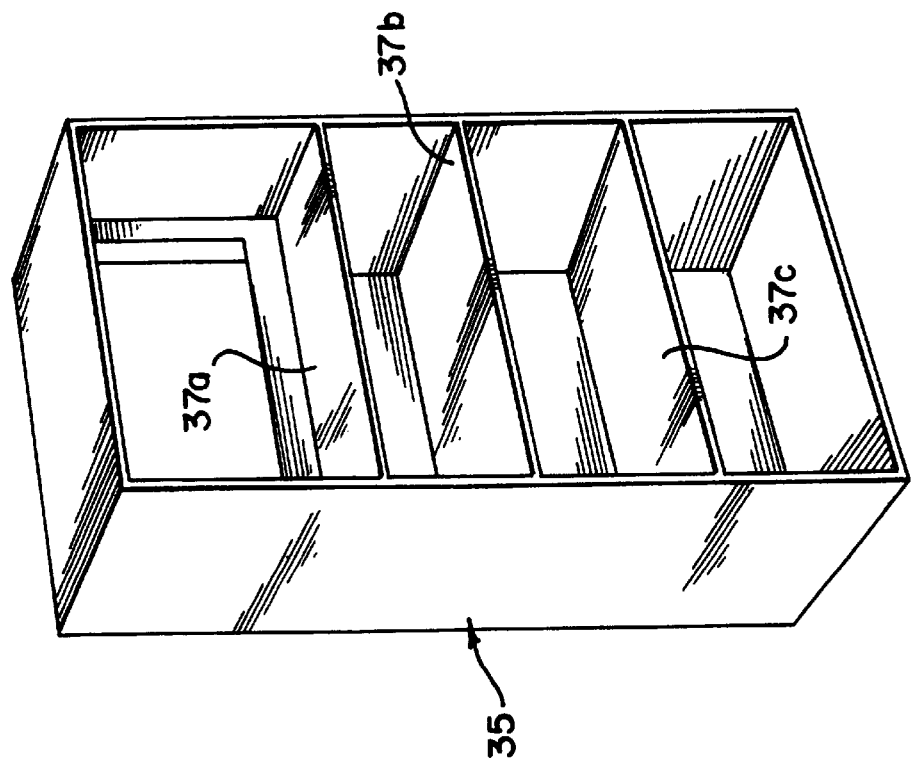

LIQUID DESICCANT AIR CONDITIONER

This application is a continuation-in-part application of application Ser. No. 08/984,741, filed Dec. 4, 1997 (U.S. Pat. No. 6,138,470).

FIELD OF THE INVENTION

The present invention relates generally to room air cooling and dehumidification, and more particularly, to a liquid desiccant air conditioner which is energy efficient, corrosion resistant, and capable of operation with low energy usage.

DESCRIPTION OF THE PRIOR ART

Typical air conditioning units operate on a vapor compression cycle. Over recent years, the phase out of CFC based air conditioning units has been dictated by environmental concerns. One alterative to vapor compression units, is the absorption system. The basic elements include an evaporator, condenser, absorber, pump, heat exchanger, throttle valve and regenerator. In the absorption cycle, an "absorbent" is used to absorb the refrigerant in the vaporized state after leaving the evaporator. The vaporized refrigerant is converted back into the liquid phase in the absorber. Heat released in the absorption process is rejected to cooling water passed through the absorber. A solution of absorbent and refrigerant is pumped to a regenerator, where heat is added and the more volatile refrigerant is separated from the absorbent through distillation. The refrigerant is then communicated to the condenser, expansion valve and evaporator in a conventional manner. A heat exchanger may be used for heat recovery between the absorbent returned to the absorber and the absorbent-refrigerant solution delivered to the regenerator.

Absorption systems currently represent only a small percentage of commercial refrigeration systems because they are generally bulky and inefficient. However, with concerns over CFCs and ever increasing energy costs, the absorption unit has potential to provide efficient cooling by taking advantage of waste heat. This may be provided by combining such an absorption unit with a liquid desiccant dehumidifier.

It is known in the art to dehumidify ambient air using liquid desiccant systems. These devices typically utilize hygroscopic liquids such as lithium bromide (LiBr), lithium chloride (LiCl) or calcium chloride ($CaCl_2$) as the desiccant solution. In a desiccant system, the desiccant solution absorbs moisture from ambient air exposed to the solution. As the desiccant solution continues to absorb moisture, it becomes dilute and must be regenerated. In the regeneration process, the desiccant solution is heated to evaporate the excess moisture or the desiccant solution is brought into contact with a hot gas to desorb the excess moisture. In some expedients, air regenerators are used to regenerate the desiccant. These arrangements have relatively high operating costs as energy is required to provide a source of heat and to generate a suitable flow of air. In others, boiler-type regenerators are employed. However, boiler embodiments are expensive, as the corrosive nature of liquid desiccant solutions necessitates the use of costly corrosion resistant metals.

A liquid desiccant dehumidification system in which a liquid desiccant is regenerated with a boiler is described in U.S. Pat. No. 4,939,906 ("the '906 Patent"). The '906 Patent discloses a gas-fired desiccant boiler and a combined desiccant regenerator/interchange heat exchanger, in which the combined regenerator/heat exchanger utilizes steam produced from the boiler to provide heat for partial regeneration. The desiccant boiler has a liquid/vapor separator chamber and thermosyphon recirculation to reduce scale and corrosion of the boiler. Specifically, the overall system is shown in FIG. 1, wherein outdoor air is drawn into the system through an inlet duct 22, and is evaporatively cooled by a water spray 24. The cooled air is directed to a desiccant conditioner 26 to which return air is also directed through a duct 30. In the desiccant conditioner 26, the return air is contacted with a liquid desiccant solution from a sprayer 28. The desiccant liquid is disclosed as lithium calcium chloride.

This dehumidified air is then supplied to the space to be dehumidified, or it can be sensibly cooled through an evaporative cooler 32. The desiccant dehumidifies the air stream, and in the process its moisture-absorbing capability is reduced; this capability is regenerated by passing a portion of the dilute desiccant from the conditioner 26 to a first interchange heat exchanger 44, wherein the temperature of the desiccant is raised. The weakened desiccant is partially concentrated in an air-desiccant regenerator 46, in which heated air from a regeneration air heater 48 contacts the liquid desiccant. This desiccant is pumped through a second interchange heat exchanger 52 and thereafter to a desiccant boiler 56, in which regeneration of the desiccant is completed. The water vapor generated in the desiccant boiler 56 raises the temperature of the air passing through the regeneration air preheater 48. The interchange heat exchangers 44, 52 reduce the temperature of the regenerated desiccant as it returns along the pipe 60 to the conditioner 26.

The boiler 56 is depicted in FIG. 2, and operates on natural circulation, with the density of the fluid (part liquid, part vapor) in the "fired" tubes 70 being less than the density of the liquid in the outer "unfired" tube 74. A porous ceramic burner 80 facilitates combustion to provide a heat source and hot combustion gases are blown through a combustion chamber formed by a housing 88 enclosing the fired tubes 70, and flow across fins 90 of the fired tubes 70. Weak desiccant is pumped into the fired tubes 70 through a manifold 94 which causes water in the desiccant to be vaporized. Accordingly, a density differential is created between the fluid in the fired tubes 70 and the unfired tubes 74 connected between the manifold 94 and a liquid/vapor separator 98 outside the combustion chamber housing 88. This density differential induces a natural flow of desiccant solution up the fired tubes 70 and down the unfired tubes 72. In this manner, the natural circulation of desiccant keeps the inside walls of the fired tubes 70 coated with desiccant to thereby reduce or prevent "hot spots" from forming on the inside of the fired tubes 70 to reduce corrosion and scale build up in the fired tubes 70.

The liquid vapor separator 98 at the top of the boiler 56 separates water vapor from the concentrated liquid desiccant. A portion of the concentrated desiccant is withdrawn from the bottom of the liquid/vapor separator 98 and is returned to the desiccant conditioner 26. Water vapor flowing out of the top of the liquid/vapor separator 98 is subsequently condensed to heat air for use in an earlier regeneration step shown in FIGS. 3 and 4.

The combined regenerator/interchange heat exchanger, depicted in FIGS. 3 and 4, comprises two (2) interchange heat exchangers 44, 52, the desiccant regenerator 46 and the regeneration air heater 48. The combined desiccant regenerator/interchange heat exchanger is identified by the reference numeral 102, and is constructed by alternately stacking two (2) different corrugated plates (see FIG. 4) to define alternating flow channels. Water vapor or steam from the desiccant boiler 56 is introduced near the top of the regenerator/exchanger 102 in alternate channels (plate A). This water vapor is condensed, thereby transferring heat to the air and weak desiccant entering adjacent channels near the top of the regenerator/heat exchanger 102 (plate B). The upper portion of each plate corresponds to the desiccant regenerator 46 and regeneration air heater 48. As the water vapor condenses, the weak desiccant and air mixture is heated and the desiccant is partially regenerated. Warm air and moisture are exhausted by fan 106 to the outdoors. An entrainer 108 is provided to prevent desiccant from escaping the combined regenerator/exchanger 102. The partially regenerated desiccant flows into the middle of a channel plate B, and is further heated by the hot concentrated desiccant removed from the liquid/vapor separator 98. Hot concentrated desiccant from the boiler 56 is introduced at the middle of plate A while the partially regenerated desiccant is removed from the middle of plate B. The partially regenerated desiccant is then pumped to the desiccant boiler 56. Diluted desiccant from the regenerator/heat exchanger 102 is introduced at the bottom of the plate A and is heated by the hot desiccant from the boiler 56. The heated dilute desiccant from the regenerator/heat exchanger 102 is then removed from the center of plate B and pumped to the top of plate B.

The apparatus shown and described in the '906 Patent suffers from several disadvantages. The regeneration process described therein requires the flow of hot air through the system in order to operate. This necessitates the use of additional components such as fans, air preheaters, and liquid/vapor separators, which adds system complexity. Furthermore, the multiple stacked plate interchange heat exchanger configuration is complex and takes up a relatively large amount of space.

The present invention provides an improved air cooling system comprising an absorption air conditioner operating in conjunction with a liquid desiccant dehumidifier.

SUMMARY OF THE INVENTION

It is an object of the present invention to provide a liquid desiccant air conditioner which dehumidifies and cools ambient air in a combined liquid desiccant-refrigerant absorption cycle.

It is another object of the present invention to provide a liquid desiccant air conditioner which does not require CFCs.

It is a further object of the present invention to provide a liquid desiccant air conditioner which is energy efficient.

It is still another object of the present invention to provide a liquid desiccant air conditioner which does not require a compressor.

It is yet another object of the present invention to provide a liquid desiccant air conditioner which does not require any external heat input to effect regeneration of the refrigerant absorbent.

It is an object of the present invention to provide a liquid desiccant air conditioner which efficiently regenerates the liquid desiccant using a simple arrangement having a minimum number of components.

It is still another object of the present invention to provide a liquid desiccant air conditioner which utilizes primarily plastic components to prevent corrosion.

It is yet another object of the present invention to provide a liquid desiccant air conditioner in which steam to desiccant heat recovery takes place in a condenser.

It is a further object of the present invention to provide a liquid desiccant air conditioner in which plastic components are used for the interchange heat exchangers.

It is yet another object of the present invention to provide a liquid desiccant air conditioner in which the waste heat radiating from the boiler is utilized in an interchange heat exchanger for desiccant regeneration.

It is still another object of the present invention to provide a liquid desiccant air conditioner having a boiler which is primarily elongated in a horizontal orientation to minimize the temperature gradient and consequent concentration differential in the liquid desiccant.

It is yet another object of the present invention to provide a liquid desiccant air conditioner which is lightweight, energy efficient, and inexpensive to manufacture.

In accordance with the foregoing objects and additional objects that will become apparent hereinafter, the present invention provides a liquid desiccant air conditioner, including a liquid desiccant absorber for absorbing moisture contained in ambient air entering the dehumidifier and passing through the desiccant absorber, the desiccant absorber constructed and arranged for receiving concentrated liquid desiccant and dispensing dilute liquid desiccant. A boiler is provided for boiling partially preheated dilute liquid desiccant to evaporate moisture to reconstitute the liquid desiccant into concentrated liquid desiccant. A condenser fluidly communicates with the boiler to receive steam generated by boiling liquid desiccant in the boiler, and with the absorber to receive dilute liquid desiccant from the absorber. The condenser is operable to sensibly heat the dilute liquid desiccant therein by recovering the latent heat of condensation as steam delivered from the boiler is condensed, to preheat the dilute liquid desiccant prior to delivery to the boiler to increase operating efficiency. An evaporator effects cooling of dehumidified air delivered from the desiccant absorber. A refrigerant is vaporized in the evaporator and passed to a refrigerant absorber which contains an absorbent solution such as, for example, ammonia-water or water-lithium bromide. The refrigerant-absorber solution is pumped to a regenerator in which the refrigerant is separated from the absorbent. The regenerator fluidly communicates with the boiler to receive steam from the boiler as a heat input to effect regeneration. A second condenser receives the reconstituted refrigerant from the regenerator. The refrigerant passes through the second condenser, and from there through an expansion valve and into the evaporator in a conventional manner. A heat exchanger may be used to recover heat from the absorbent as it is returned to the refrigerant absorber to preheat the refrigerant-absorbent solution prior to introduction of the solution into the regenerator.

In a preferred embodiment, the invention provides a liquid desiccant air conditioner including a liquid desiccant absorber for absorbing moisture contained in ambient air entering the dehumidifier and passing through the desiccant absorber, the desiccant absorber constructed and arranged for receiving concentrated liquid desiccant and dispensing dilute liquid desiccant. A boiler is provided for boiling partially preheated dilute liquid desiccant to evaporate moisture to reconstitute the liquid desiccant into concentrated liquid desiccant. A first heat exchanger fluidly communicates with the desiccant absorber and a second heat exchanger. The first heat exchanger is operable to transfer heat from the concentrated liquid desiccant to the dilute liquid desiccant directed to the first heat exchanger from the desiccant absorber to raise the temperature of the dilute liquid desiccant to a first temperature. A condenser fluidly communicates with the boiler to receive steam generated by boiling the liquid desiccant in the boiler, and with the first heat exchanger to receive partially heated dilute liquid desiccant from the first heat exchanger at the first temperature. The condenser is operable to sensibly heat the dilute liquid desiccant therein to a second temperature by recovering the latent heat of condensation as steam delivered from the boiler is condensed. The second heat exchanger fluidly communicates with the condenser, the boiler and the first heat exchanger. The second heat exchanger is operable to transfer heat from concentrated liquid desiccant directed to the second heat exchanger from the boiler to the dilute liquid desiccant directed to the second heat exchanger from the condenser at the second temperature to raise the temperature of the dilute liquid desiccant to a third temperature. The dilute liquid desiccant at the third temperature is directed to the boiler and the concentrated liquid desiccant from the second heat exchanger is directed to the first heat exchanger. The second heat exchanger is disposed with respect to the boiler to recover waste heat from the boiler. A pump is provided for pumping concentrated liquid desiccant into the absorber. An evaporator effects cooling of dehumidified air delivered from the desiccant absorber. A refrigerant is vaporized in the evaporator and passed to a refrigerant absorber which contains an absorbent solution such as, for example, ammonia-water or water-lithium bromide. The refrigerant-absorber solution is pumped to a regenerator in which the refrigerant is separated from the absorbent. The regenerator fluidly communicates with the boiler to receive steam from the boiler as a heat input to effect regeneration. A second condenser receives the reconstituted refrigerant from the regenerator. The refrigerant passes through the second condenser, and from there through an expansion valve and into the evaporator in a conventional manner. A heat exchanger may be used to recover heat from the absorbent as it is returned to the refrigerant absorber to preheat the refrigerant-absorbent solution prior to introduction of the solution into the regenerator.

In a preferred embodiment, the desiccant absorber includes a top and a bottom and comprises: a plurality of horizontally and vertically disposed interconnected microglass fiber plates; a distributor disposed above the fiber plates at the top of the desiccant absorber for introducing the concentrated desiccant into the desiccant absorber; and a drain pan for collecting the dilute desiccant disposed at the bottom of the desiccant absorber.

The first heat exchanger comprises at least one tube assembly including an inner tube concentrically disposed within an outer tube to define an annulus therebetween. The dilute liquid desiccant from the desiccant absorber is passed through the inner tube, and the concentrated liquid desiccant is passed through the annulus, or vice-a-versa.

The second heat exchanger comprises at least one tube assembly including an inner tube concentrically disposed within an outer tube to define an annulus therebetween. The tube assembly is coiled around the boiler to recover waste heat passing through the walls of the boiler. The concentrated liquid desiccant from the boiler is passed through the annulus and the partially heated dilute liquid desiccant from the condenser is passed through the inner tube, or vice-a-versa.

In a preferred embodiment, the inner tubes of the heat exchangers are fabricated from polytetrafluoroethyline, which is commercially available under the tradename TEFLON and will hereinafter referred to under its tradename. The outer tubes are fabricated from silicone rubber.

The inner tubes may be convoluted or corrugated to increase the available heat transfer area.

In a preferred embodiment, the condenser comprises an inner shell disposed within an outer housing defining at least one chamber between the inner shell and the housing. Steam is directed to the inner shell from the boiler through a steam inlet. The housing includes a solution inlet to direct partially heated dilute liquid desiccant from the first heat exchanger into the at least one chamber. A solution outlet communicates with the chamber and directs partially heated dilute desiccant at the second temperature to the second heat exchanger. The inner shell is fabricated from materials including inconel, monel, titanium, TEFLON, TEFLON-coated copper, TEFLON-coated aluminum, and TEFLON-coated stainless steel; and the outer shell is fabricated from materials including Teflon, polycarbonate, polyvinylidene fluoride, polypropylene, silicone rubber, polyethylene, and polystyrene.

In an alternative embodiment, the condenser comprises at least one steam inlet communicating steam from the boiler with the at least one chamber and at least one solution inlet communicating partially heated dilute liquid desiccant from the first heat exchanger with the inner shell.

The condenser may incorporate a plurality of fins associated with the inner shell and a plurality of fins associated with the housing. The inner shell may be provided with a plurality of baffles to prevent short circuiting from the steam inlet to the condensate outlet.

In another embodiment, the condenser comprises a housing and a plurality of convoluted tubes. The tubes are supported by opposing support plates, and communicate with a steam inlet to receive steam from the boiler. The housing includes a solution inlet to receive partially heated dilute liquid desiccant from the first heat exchanger, and a solution outlet through which partially heated dilute liquid desiccant is delivered to the second heat exchanger. The tubes are fabricated from TEFLON, and the support plates include at least one silicone rubber sheet attached thereto.

In a preferred embodiment, the respective components are disposed with respect to one another to take advantage of gravity feed to communicate the liquid desiccant from the absorber to the boiler via the first and second heat exchangers and the condenser, thereby eliminating the need for multiple pumps in the system.

BRIEF DESCRIPTION OF THE DRAWINGS

In accordance with the above, the present invention will now be described in detail with particular reference to the accompanying drawings.

FIG. 1 is a schematic of a first embodiment of a liquid desiccant air conditioner in accordance with the present invention;

FIGS. 3A and 3B schematically illustrate a third embodiment of a liquid desiccant air conditioner in accordance with the present invention;

FIGS. 4A and 4B schematically illustrate a fourth embodiment of a liquid desiccant air conditioner in accordance with the present invention;

FIG. 9 is an exploded isometric view of a desiccant absorber assembly;

FIG. 9A is a detail view of the microglass fiber plates in the absorber;

FIG. 9B is a side elevational view of a desiccant absorber in another embodiment;

FIG. 9C is a detail view of the absorber pads;

FIG. 9D is an isometric view of the desiccant absorber of FIG. 9B;

FIG. 10 is an isometric view of a boiler;

FIG. 13 is an isometric cut-away view of a condenser in a first embodiment;

FIG. 14 is an isometric cut-away view of an inner shell of the condenser shown in FIG. 13;

FIG. 15 is an isometric cut-away view of a condenser in a second embodiment;

FIG. 16 is an isometric cut-away view of a condenser in a third embodiment;

FIG. 17 is an isometric view of a condenser in a fourth embodiment;

FIG. 18 is an isometric view of a condenser in a fifth embodiment;

FIG. 19 is an isometric cut-away view of a frame for housing the respective components of the system; and FIG. 20 is an isometric cut-away view depicting the frame and some of the components installed therein.

DETAILED DESCRIPTION OF THE PREFERRED EMBODIMENTS

Figure 2A:
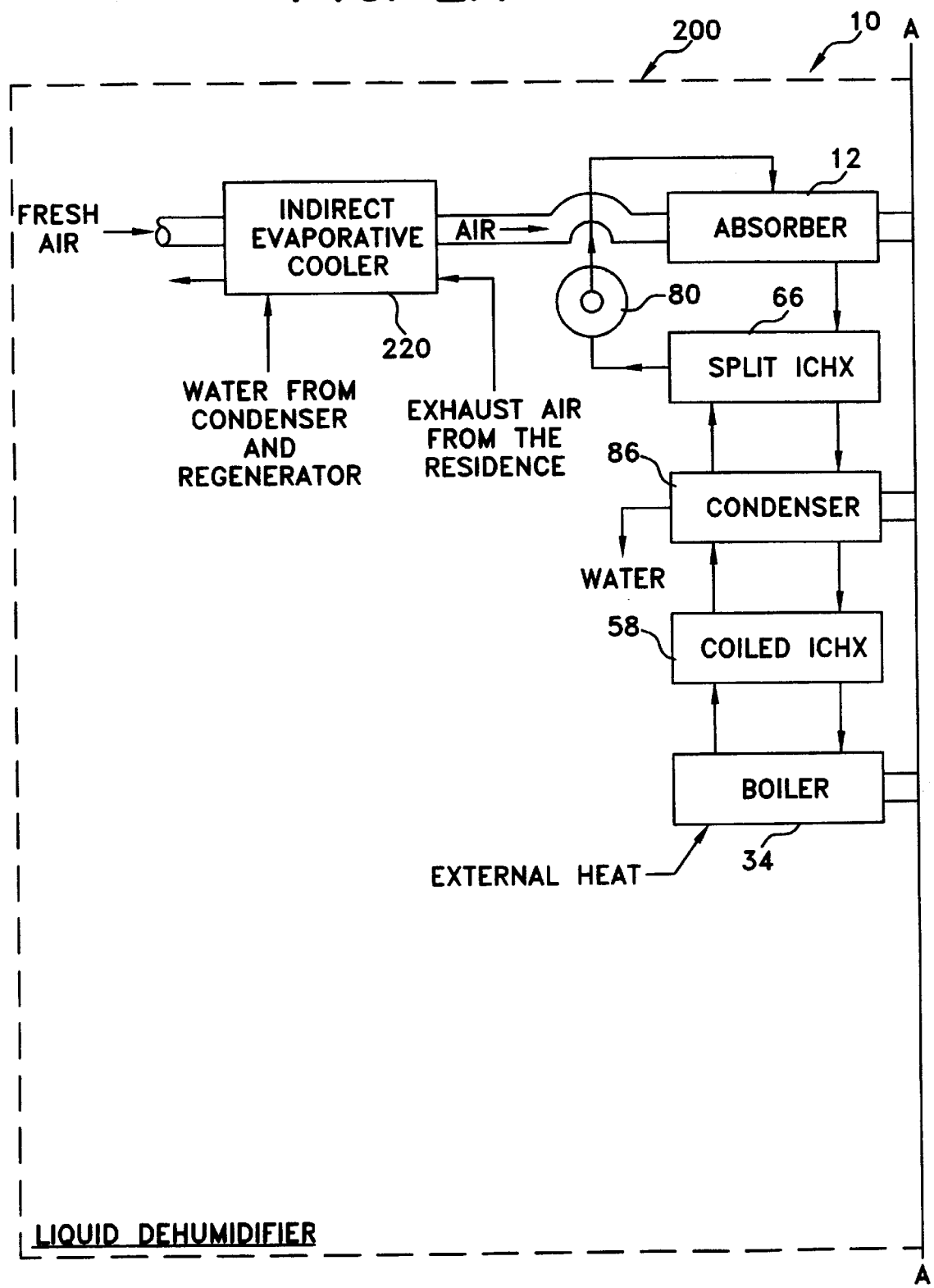
FIGS. 2A and 2B schematically illustrate a second embodiment of a liquid desiccant air conditioner in accordance with the present invention.

Referring to the several views of the drawings, there is shown a liquid desiccant air conditioner ("LDA"), generally characterized by the reference numeral 10.

FIG. 1 is a schematic of the LDA 10 in a first embodiment. The LDA 10 is principally comprised of a liquid desiccant dehumidifier 200 and an absorption air conditioner 202. The details of the liquid desiccant dehumidifier 200 are described in detail below and are the same as disclosed in U.S. application Ser. No. 08/984,741 to the same assignee, filed Dec. 4, 1997. The liquid desiccant dehumidifier 200 primarily includes an absorber 12, condenser, 86, and boiler 34. An interchange heat exchanger 58 is disposed between boiler 34 and condenser 86, and a split interchange heat exchanger 66 is located between condenser 86 and absorber 12. These components are described below. Specifically, the LDA 10 dehumidifies incoming ambient air prior to effecting sensible cooling of the air in the air conditioner 202. The absorption cycle employs waste heat generated by the boiler 34 of liquid desiccant dehumidifier 200 for energy efficient cooling and dehumidification. The air conditioner 202 employs the known absorption cycle, and includes an absorber 204, a pump 206, a heat exchanger 208, at throttle valve 210, a regenerator 212, an evaporator 214, a condenser 216, and an expansion valve 218. In the absorption cycle, an absorbent, such as aqueous ammonia or aqueous lithium bromide, is used to absorb refrigerant in the vaporized state after leaving evaporator 214. The vaporized refrigerant is absorbed back into the liquid phase in absorber 204. Heat released in the absorption process is rejected to cooling water or air passed through absorber 204. A solution of absorbent and refrigerant is pumped to regenerator 212, where heat is added and the more volatile refrigerant is separated from the absorbent. The refrigerant is then communicated to condenser 216, through expansion valve 218 and into the evaporator 214 in a conventional manner. A heat exchanger 208 may be used for heat recovery between the warm absorbent returned to the absorber 204 through throttle valve 210, and the absorbent-refrigerant solution delivered from the absorber 204 to the regenerator 212 via pump 206. The regenerator 212 fluidly communicates with boiler 34 to receive steam generated in reconstituting the liquid desiccant as described below. In this manner, no external heat input is required to regenerate the refrigerant. The heat exchanger 208 can configured as described below with respect to interchange heat exchanger 66 of the liquid desiccant dehumidifier 200.

Figure 2B:
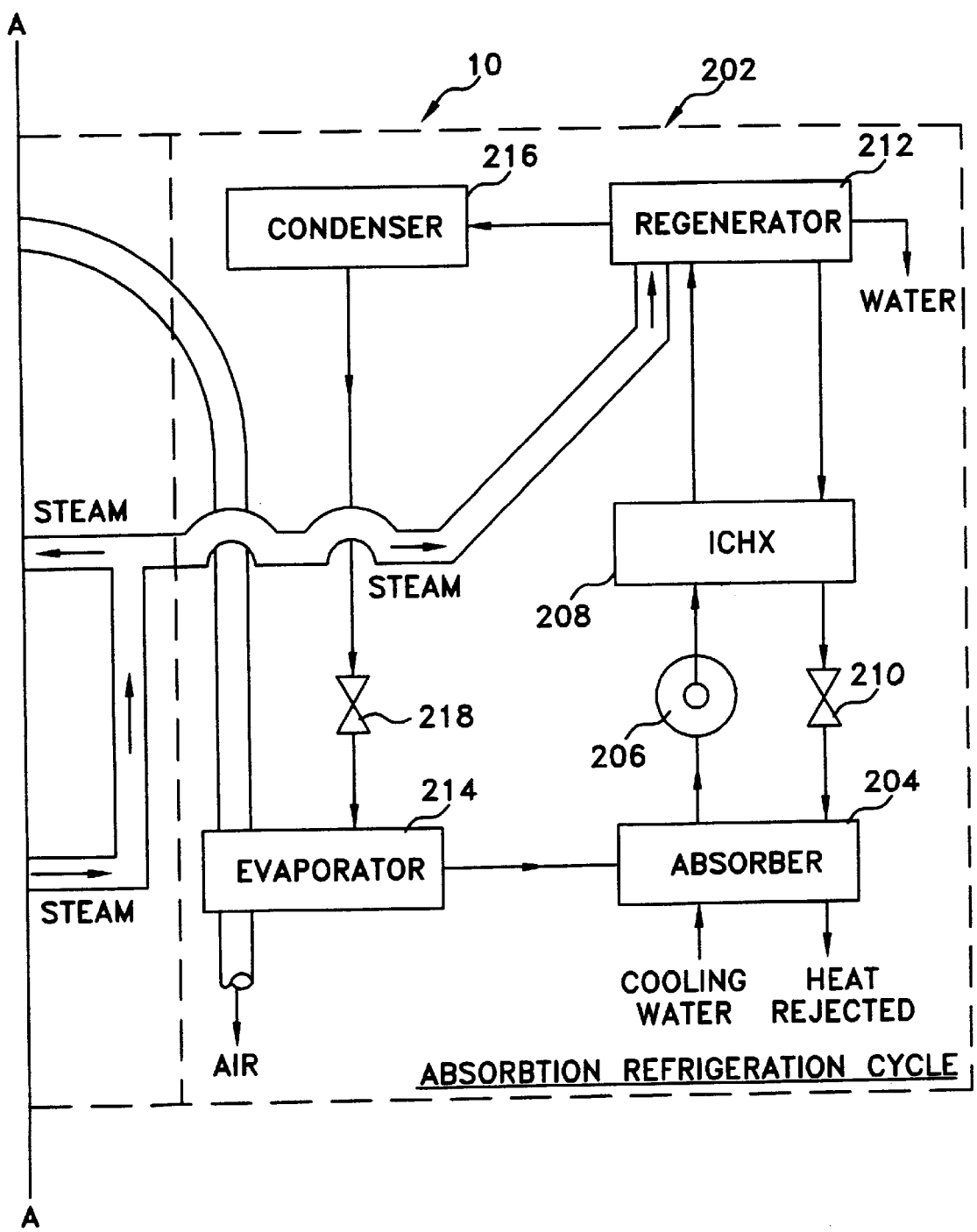

FIG. 2 is a schematic of a second embodiment of the LDA 10, which adds an indirect evaporative cooler 220 for cooling the incoming air with exhaust air from the residence prior to passing the incoming air through the desiccant absorber 12. The indirect evaporator cooler 220 receives a water supply from condenser 86 and regenerator 212. Fresh air is directed into the cooler 220 from the ambient, cooled, and thereafter delivered to desiccant absorber 12. The remainder of the cycle operates as described above.

Figure 3A:
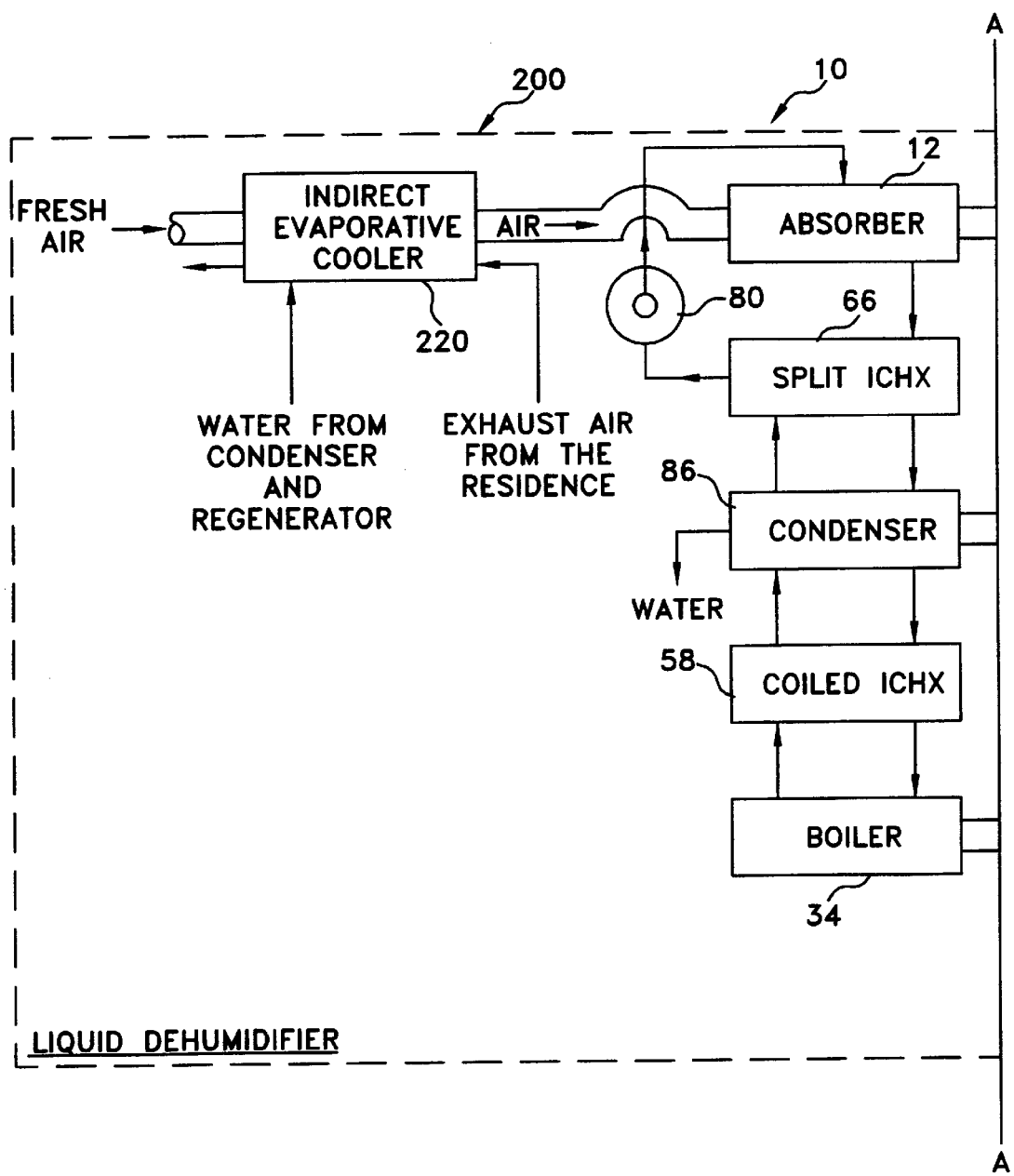
Figure 5A:
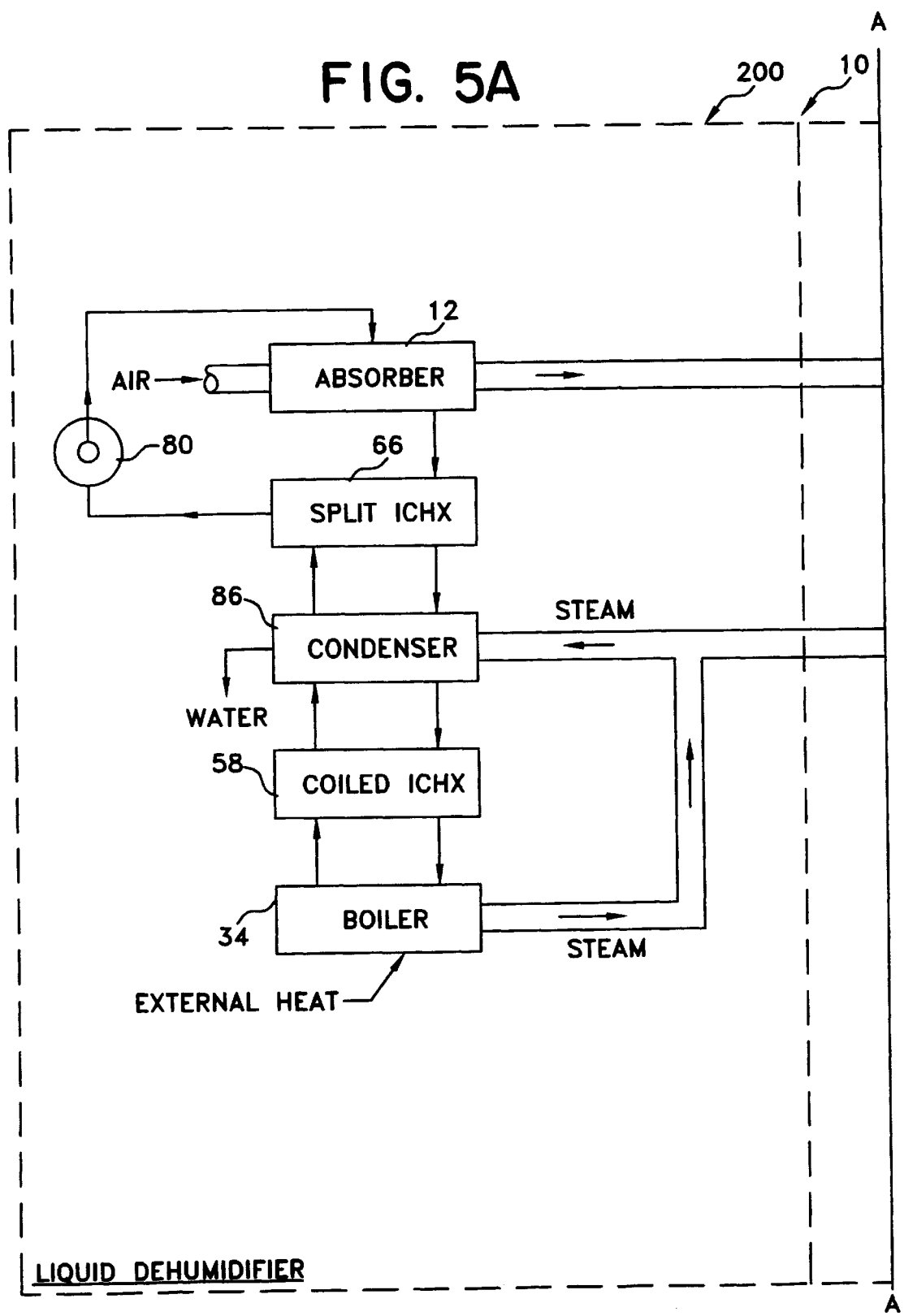
FIGS. 5A and 5B schematically illustrate a fifth embodiment of a liquid desiccant air conditioner in accordance with the present invention.
Figure 5B:
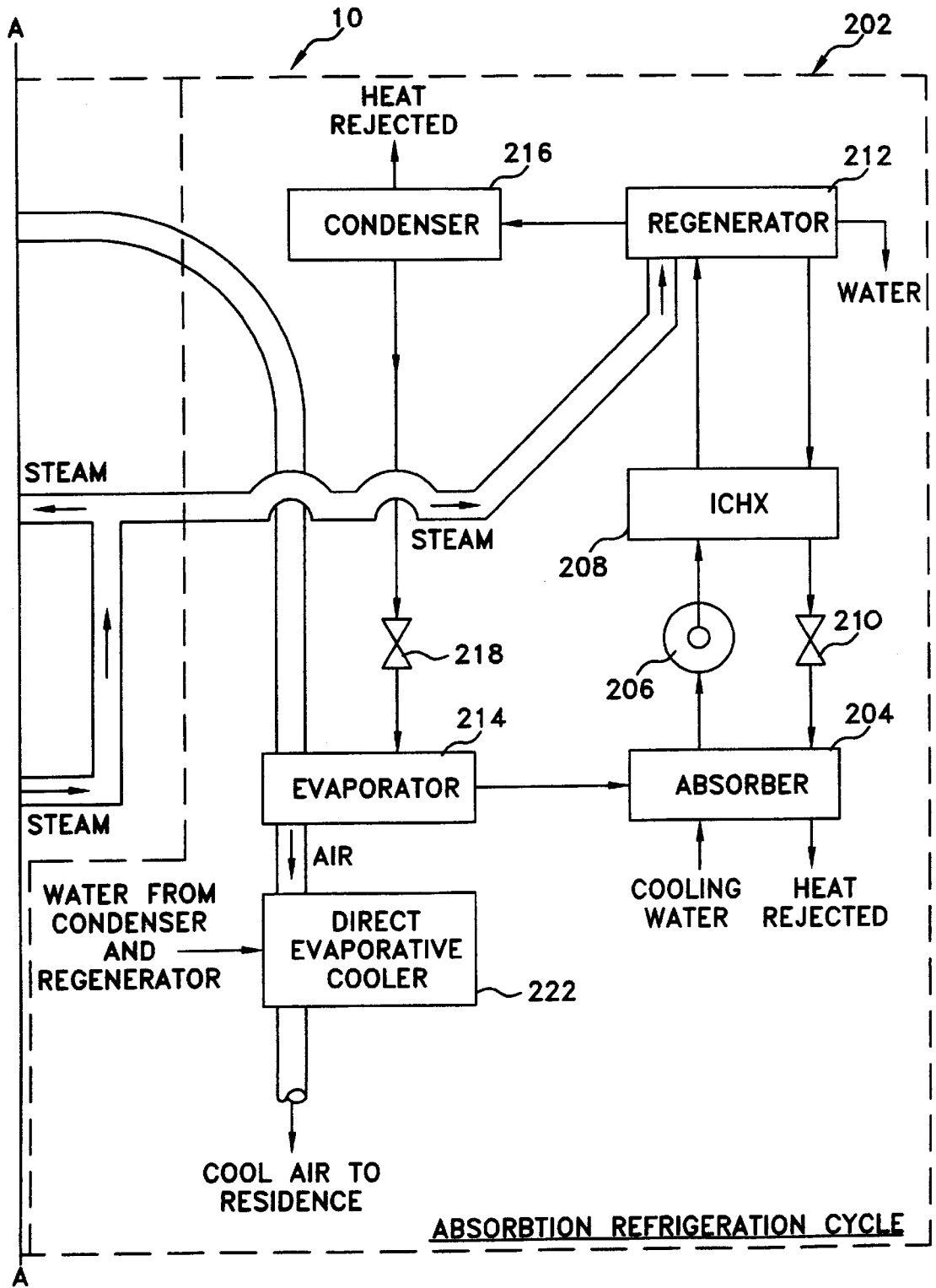

FIG. 3 is a schematic of a third embodiment of the LDA 10, which adds a direct evaporative cooler 222 to the embodiment of FIG. 2. The direct evaporative cooler 222 is operable to further cool the air prior to delivery to the ambient. Water is supplied to cooler 222 from condenser 86 and regenerator 212. FIG. 4 is a schematic of a fourth embodiment of the LDA 10, in which the ambient air is first directed into the absorber 12 for dehumidification, and then into the indirect evaporative cooler 220 for cooling. FIG. 5 is a schematic of a fifth embodiment of the LDA 10, which is similar to that shown in FIG. 1, but adds the direct evaporative cooler 222.

Figure 6:
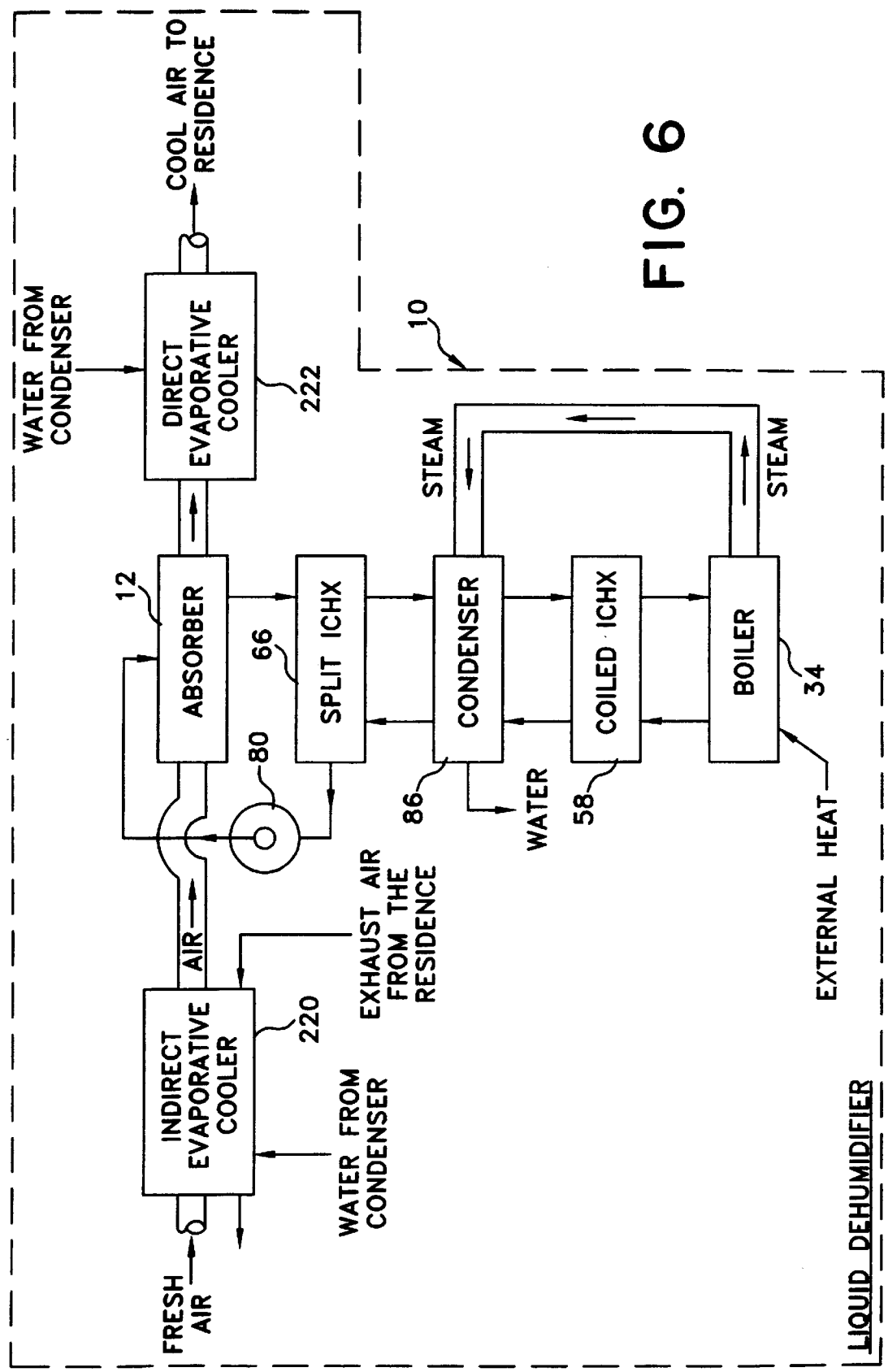
FIG. 6 is a schematic of a sixth embodiment of a liquid desiccant air conditioner in accordance with the present invention.
Figure 7:
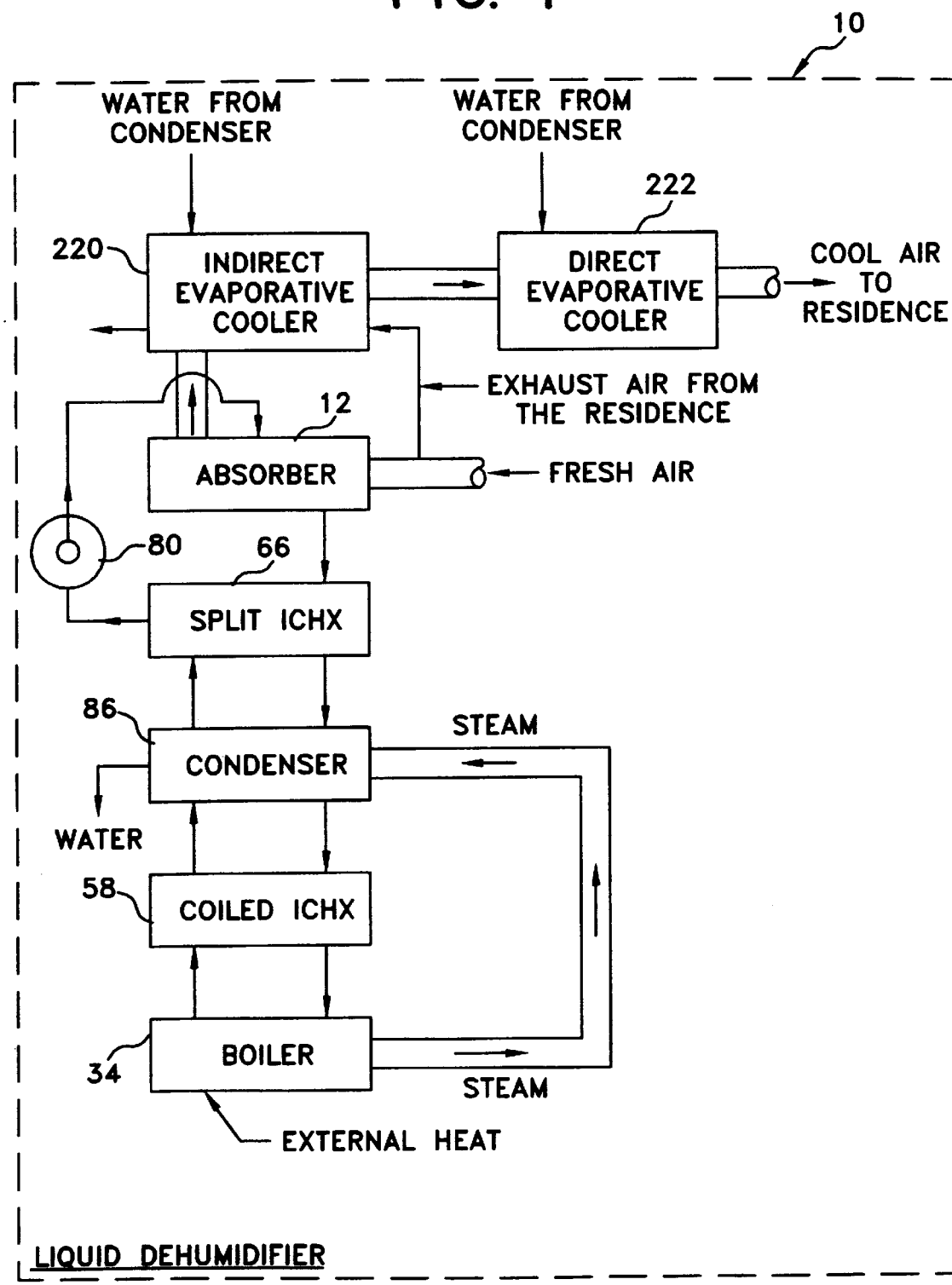
FIG. 7 is a schematic of a seventh embodiment of a liquid desiccant air conditioner in accordance with the present invention.

FIG. 6 is a schematic of a sixth embodiment of the LDA 10 which does not utilize a refrigerant. In this expedient, the LDA 10 cooperates with an indirect evaporative cooler 220 and a direct evaporative cooler 222 to cool and dehumidify the incoming air. The air is directed through indirect evaporative cooler 220, cooled, and thereafter delivered to the desiccant absorber 12. The dehumidified air is then passed through the direct evaporative cooler 222, where it is further cooled by sensible cooling, and exhausted to the ambient. The principle of operation is generally the same as described above. Water from condenser 86 is delivered to indirect evaporative cooler 220 and direct evaporative cooler 222. Exhaust air from the residence is communicated to the indirect evaporative cooler 220. FIG. 7 is a schematic of a seventh embodiment of the LDA 10, which is similar to that shown in FIG. 6 and described above, but here the incoming ambient air is first dehumidified in the desiccant absorber 12, and thereafter cooled in the indirect evaporative cooler 220.

Figure 8:
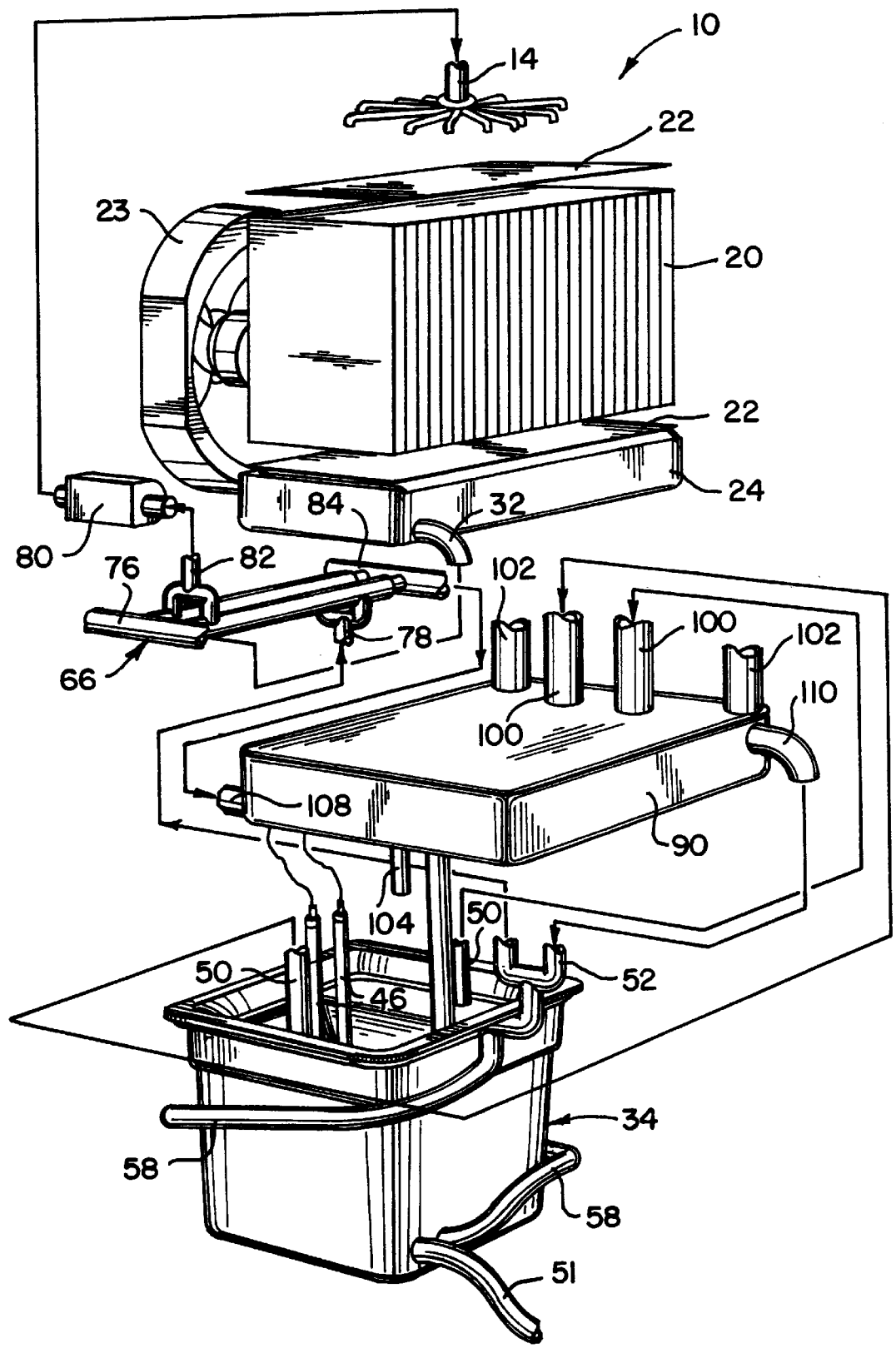
FIG. 8 is an exploded isometric view of the portable liquid desiccant dehumidifier in accordance with the present invention.
Figure 8A:
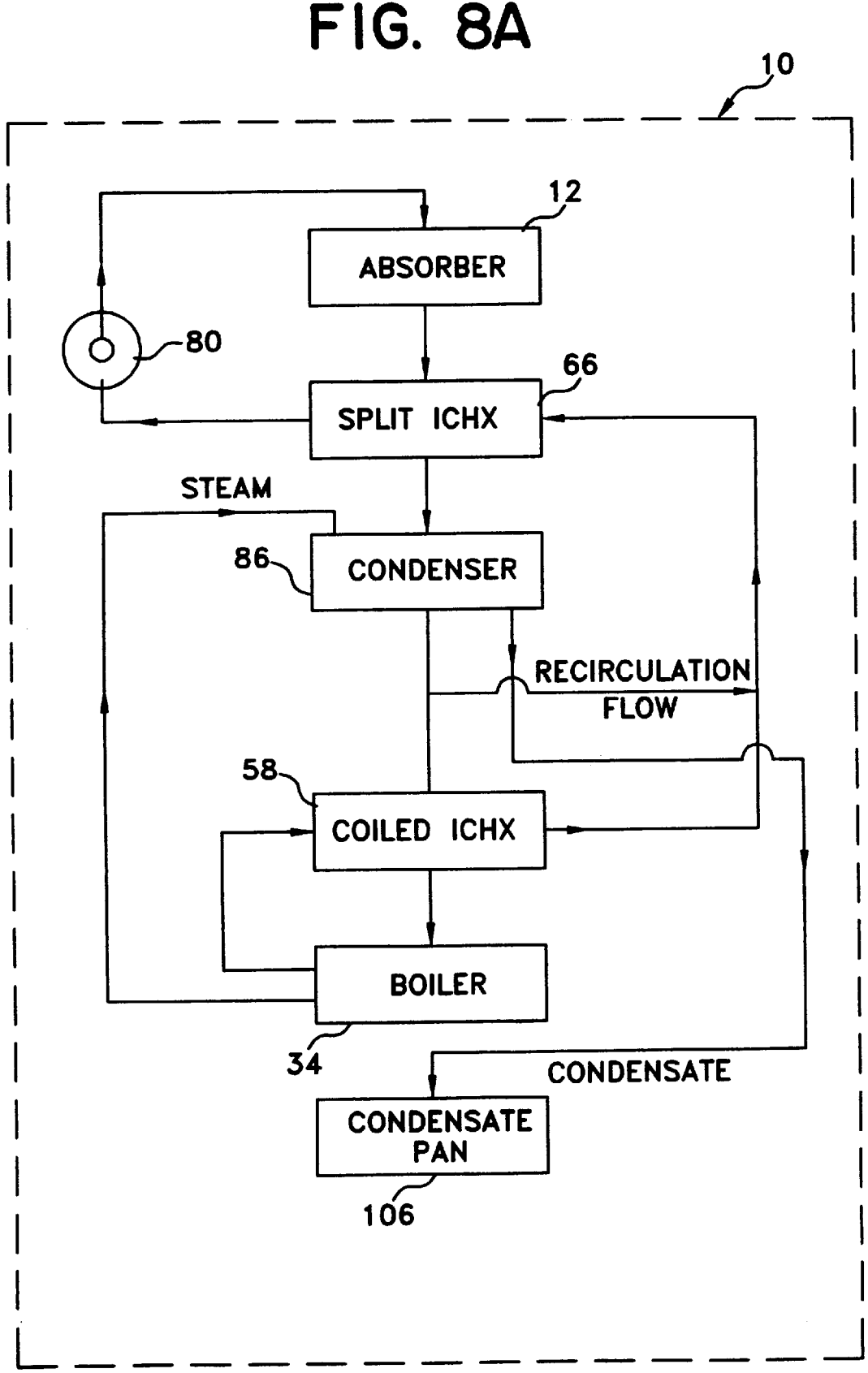
FIG. 8A is a block diagram depicting the general operation of the liquid desiccant dehumidifier.

Referring now to FIGS. 8 and 8A, the desiccant dehumidifier section 100 includes liquid desiccant absorber 12 for absorbing moisture contained in air entering air conditioner 10 and passing through desiccant absorber 12. The desiccant absorber 12 is constructed and arranged for receiving concentrated liquid desiccant at the top of desiccant absorber 12 and dispensing dilute liquid desiccant from the bottom of desiccant absorber 12. The desiccant solution may be any one of several conventional solutions, including aqueous LiBr, LiCl or $CaCl_2$, as described above, or any mixture of these solutions. Referring now to FIGS. 9 and 9A, desiccant absorber 12 includes a distributor 14 disposed at the top of desiccant absorber 12 which receives concentrated liquid desiccant and delivers the liquid desiccant through a plurality of "spaghetti" tubes 16 extending radially outward from a central hub 18. The desiccant absorber 12 includes a plurality of horizontally and vertically disposed interconnected microglass fiber plates. The vertical plates are identified by the reference numeral 20, and are supported by horizontal interconnecting fiber plates 22 as shown. The top plate 22 is referred to as a distribution sheet. The concentrated desiccant wicks into the distribution sheet 22 and down the vertical plates 20. The vertical plates 20 contain beads 21 which separate and support contiguous vertical plates 20. Ambient air is drawn into the unit and forced through the microglass fiber plates by a fan 23 (see FIG. 8), where the moisture in the air is removed as the air makes contact with the liquid desiccant. As the desiccant dehumidifies the air stream, the moisture-absorbing capability of the desiccant is reduced and the desiccant must be regenerated. This dilute desiccant is collected in a drain pan 24 disposed at the bottom of desiccant absorber 12. The drain pan 24 includes an intermediate support plate 26 defining at least one drain hole 28 which enables the dilute desiccant to flow into a bottom chamber defined between support plate 26 and a bottom wall 30 of drain pan 24. A drain tube 32 including a one-way or check valve 33 extends from the bottom chamber to direct the dilute desiccant out of absorber 12. The absorber components are disposed within a frame 35 as shown in FIG. 19, which can be fabricated from materials including, but not limited to, polypropylene, polyethylene, TEFLON, polyvinylidene fluoride, polycarbonate, PVC or polystyrene. The frame 35 includes a plurality of shelves 37a, 37b, and 37c for supporting the respective components of the unit described below.

In an alternative embodiment shown in FIGS. 9B–9D, a plurality of absorber pads 20a are stacked side-by-side and bonded together at the ends with an adhesive "A" (or taped) so that the gaps between the pads 20a are completely sealed to force the liquid desiccant to wick through the pads 20a. The pads 20a are received in an aperture or slots in a top tray or distributor pan 25 and a bottom tray or drain pan 27. Any gaps between the pads 20a and the pans 25, 27 may be filled with an RTV silicone sealant or like material. Liquid desiccant is communicated into the distributor pan 25 through an inlet 29. This configuration prevents the liquid desiccant from just flowing over the surface of the pads, and consequently increases absorber efficiency. The trays 25, 27 effectively prevent spillage of liquid desiccant from the absorber 12 in the event of tilting. In addition, the liquid desiccant supplied to the distributor pan 25 forms a thin film on the pan surfaces to reach every distributor pad 20a to improve desiccant distribution.

The dilute liquid desiccant is regenerated into concentrated desiccant by boiling the liquid desiccant in a boiler 34 at a temperature in the range of from approximately 260° F. to 320° F. An improvement over prior art systems resides in the use of steam to desiccant heat recovery to directly preheat the dilute liquid desiccant. The dilute liquid desiccant is thus passed through a condenser and preheated using the latent heat of condensation of the steam produced by boiling the liquid desiccant. Preferably, a series of interchange heat exchangers are employed to further preheat the dilute liquid desiccant entering the boiler 34 by recovering heat from the concentrated liquid desiccant delivered to absorber 12 from boiler 34 to further increase operating efficiency. These components are described in more detail below.

The boiler 34 is shown in FIG. 10, and is configured in the shape of a tub or vessel having an elongated horizontal dimension. The horizontal elongation provides a uniform temperature gradient, and thus a uniform concentration level of the liquid desiccant solution, as compared to a vertically elongated boiler. The boiler 34 includes side walls 36, a bottom wall 38, a top wall 40, and a peripheral support flange 42. The boiler 34 is constructed from materials including, but not limited to, polycarbonate, polyvinylidene fluoride, TEFLON, fiber glass and the like. A heating element 44 is coiled proximal to the bottom wall 40 as shown, and is connected to a pair of leads 46 in a conventional manner. A thermocouple 48 extends into boiler 34 to monitor the internal temperature. The leads 46 and thermocouple 48 extend through top wall 40. The heating element 44 and thermocouple 48 are operably associated with a controller (not shown) for maintaining boiler 34 at the optimum temperature. A pair of steam outlets 50 extend through top wall 40 to deliver steam generated by boiling the liquid desiccant to a condenser described in more detail below.

Figure 11:
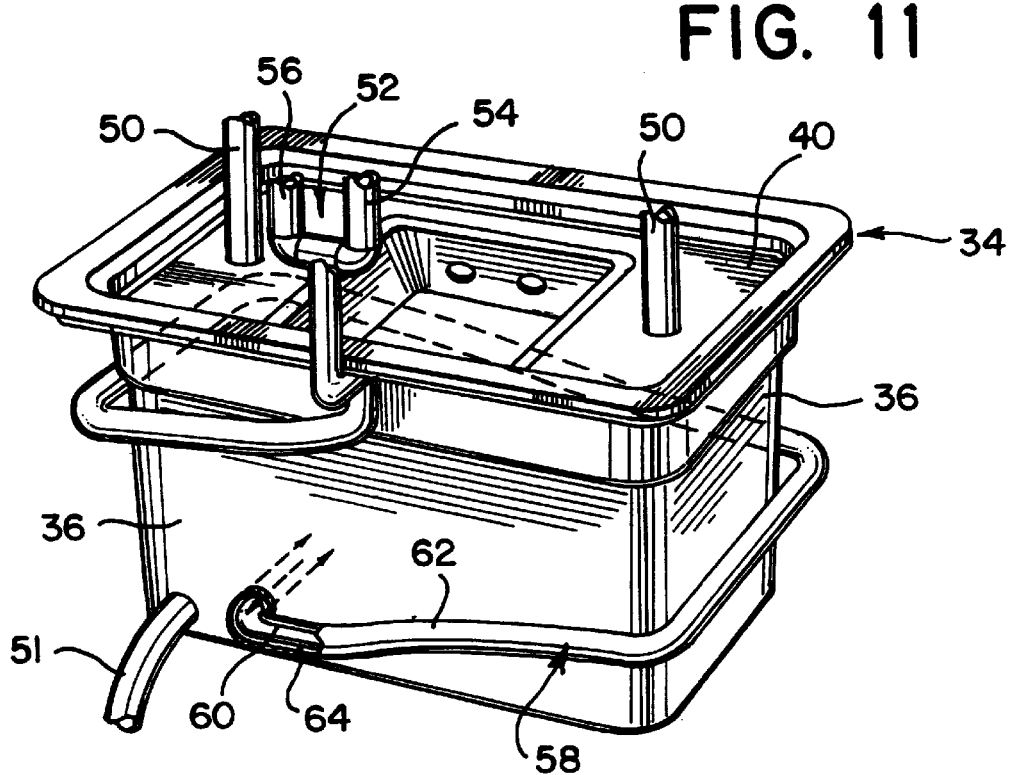
FIG. 11 is an isometric view of a coiled interchange heat exchanger and the boiler.

Referring now to FIG. 11, a drain tube 51 is coupled to one of the side walls 36 to enable boiler 34 to be emptied as required. A U-fitting 52 is coupled to the upper region of one of the side walls 36 to receive preheated dilute liquid desiccant from the condenser through an inlet port 54, and to dispense concentrated liquid desiccant through an outlet port 56. The U-fitting 52 communicates with a coiled interchange heat exchanger 58, which comprises at least one tube assembly including an inner tube 60 concentrically disposed within an outer tube 62 to define an annulus 64 therebetween. The tube assembly is coiled around boiler 34 to recover the waste heat radiating through side walls 36. This arrangement is exemplary, as the tube assembly could be embedded within the side walls 36, or disposed in contact with top wall 40. The concentrated liquid desiccant from boiler 34 enters the annulus 64 through side wall 36 and is directed to outlet port 56. The partially heated dilute liquid desiccant from the condenser is passed through the inner tube 60 in a direction counter to the concentrated liquid desiccant and enters boiler 34 through side wall 36. Alternatively, the concentrated liquid desiccant is passed through inner tube 60 and the dilute liquid desiccant is passed through annulus 64. In a preferred embodiment, inner tube 60 is fabricated from TEFLON, and outer tube 62 is constructed from silicone rubber. The TEFLON inner tube 60 has relatively high heat conductivity, while the outer silicone rubber tube 62 has a relatively low thermal conductivity, and is a good insulator. These components can withstand relatively high temperatures (~400° F.), and are not corroded by the desiccant solution. To improve efficiency, inner tube 60 may be convoluted as shown in FIG. 12A or corrugated as shown in FIG. 12B. It is to be understood that the use of this type of TEFLON/silicone rubber tube-in-tube heat exchanger is not limited to a liquid desiccant system. There are many applications in which this arrangement may be employed. The particular operation of the coiled interchange heat exchanger 58 will be described in more detail below.

Figure 11A:
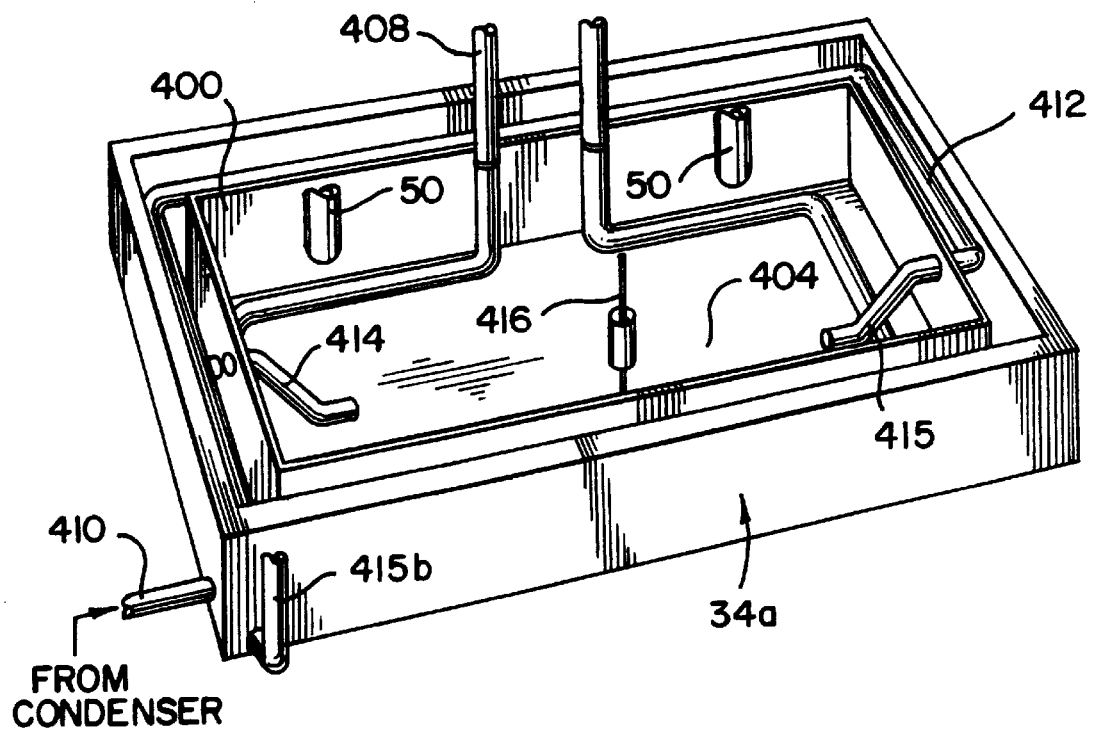
FIG. 11A is an isometric view of a boiler in an alternative embodiment.

Referring now to FIG. 11A, there is shown an isometric view of an boiler 34*a* in an alternative embodiment, having a double-wall configuration including an inner wall 400 and an outer wall 402 which define an inner vessel 404 and an outer vessel 406. A heating element 408 extends into the inner vessel 404 and around the floor as shown. The incoming liquid desiccant from condenser 86 enters the outer vessel 406 of the boiler at inlet 410. Hot liquid desiccant from the inner vessel 404 is communicated into pipe 412 which coils through the outer vessel 406 to effect heat transfer with the incoming liquid desiccant. The desiccant puddle contained in the outer vessel 406 is heated and the hottest portion of the liquid is forced to rise to the top of the vessel 406. It is then fed into the inner vessel 404 via an inlet 414. A thermocouple 416 is disposed in the inner vessel 404 as described above to control the boiler temperature. This arrangement forces any heat radiated or conducted from the inner vessel 404 to flow through the desiccant puddle in the outer vessel 406, thereby reducing thermal losses, and pressure losses attributable to long flow paths. The heating element 408 is disposed below the pump suction or inner vessel boiler outlet 415*a* so that heating element 408 is always immersed in a pool of liquid desiccant within the inner vessel 404. In this manner, the pump 80 stops drawing liquid desiccant from inner vessel 404 before it is reduced to a level beneath the heating element 408. Hot liquid desiccant leaves the boiler through outlet 415*b*. This arrangement eliminates the need for a low-level control switch. High level control in the boiler is necessary to provide consistent dehumidification and to prevent excess liquid buildup. A high level control switch can be eliminated by sizing the inner vessel 404 with an internal volume equal to approximately twice the volume of pooled liquid desiccant accumulation. This takes advantage of the inherent desiccant properties to make the system flexible to adapt to varying weather conditions without compromising performance.

Figure 12:
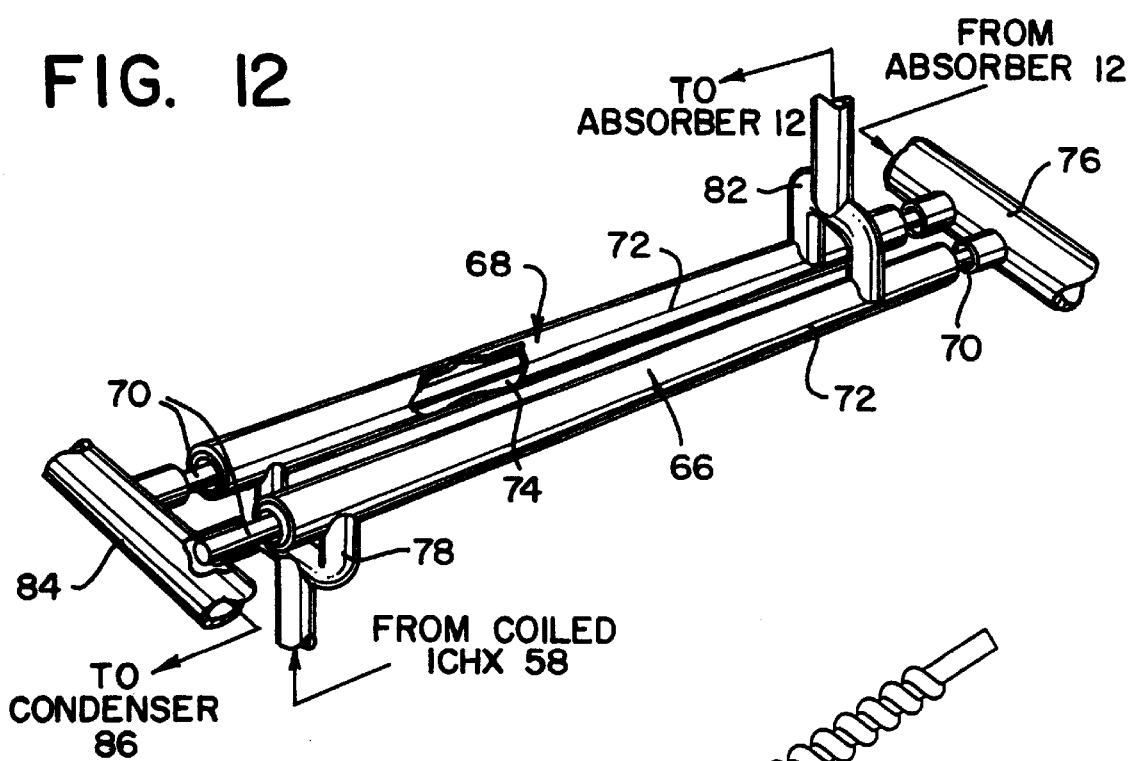
FIG. 12 is an isometric view of a split interchange heat exchanger.
Figure 12A:
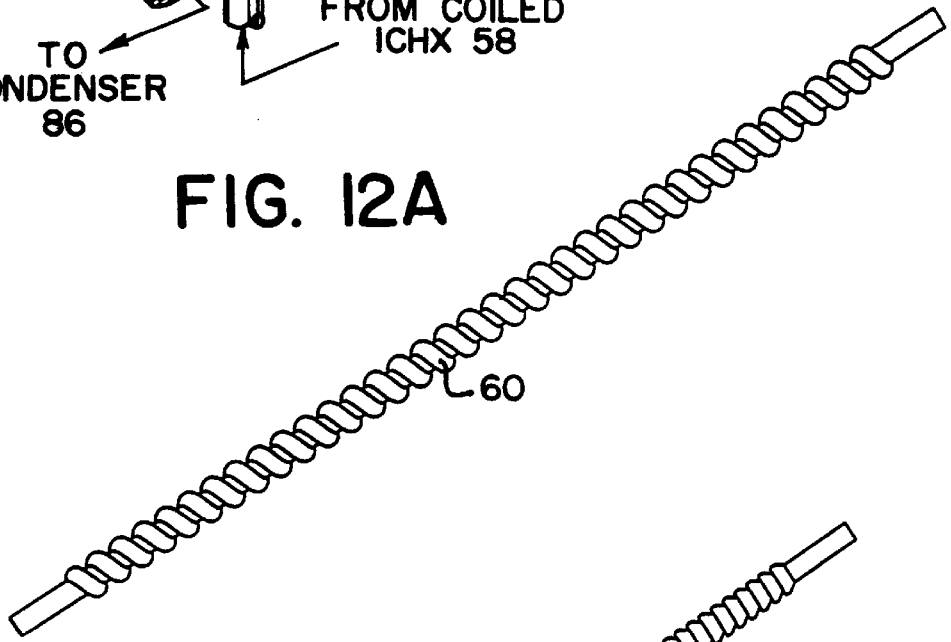
FIG. 12A is a plan view of an inner tube for an interchange heat exchanger having a convoluted profile.
Figure 12B:
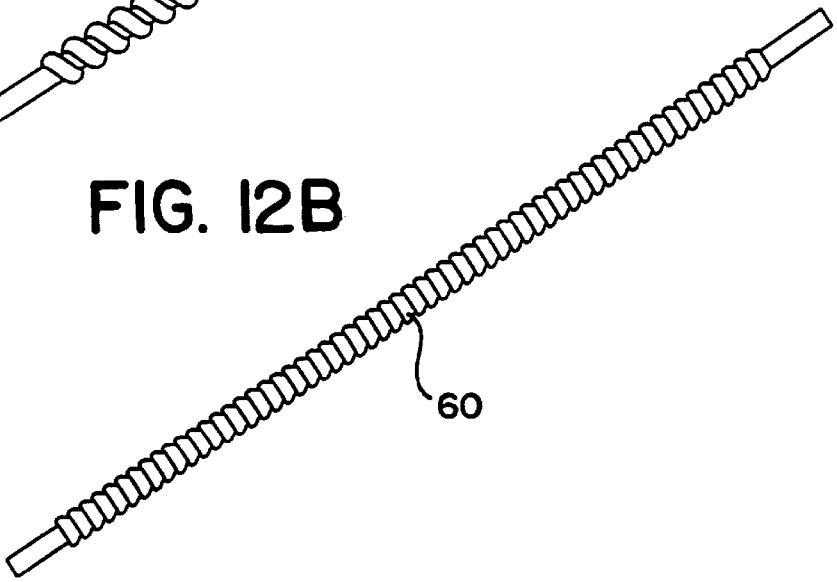
FIG. 12B is a plan view of an inner tube for an interchange heat exchanger having a corrugated profile.

Referring now to FIG. 12, there is depicted a split interchange heat exchanger 66, which includes a pair of tube assemblies 68. Each tube assembly 68 comprises an inner tube 70 concentrically disposed within an outer tube 72 to define an annulus 74 therebetween. The dilute liquid desiccant from desiccant absorber 12 is gravity fed to the interchange heat exchanger 66, where it is directed through a manifold 76 and into the inner tubes 70. Concentrated liquid desiccant from boiler 34 is first delivered through coiled interchange heat exchanger 58 and thereafter directed through a U-fitting 78 coupled to the respective outer tubes 72 and into the annuli 74. Alternatively, dilute liquid desiccant is passed through annuli 74 and concentrated liquid desiccant is passed through inner tubes 70. In this manner, heat is transferred from the concentrated liquid desiccant to the dilute liquid desiccant within split interchange heat exchanger 66. The concentrated liquid desiccant is thereafter drawn into a pump 80 (see FIGS. 8 and 8A) through a U-fitting 82 coupled to the respective outer tubes 72. The pump 80 delivers the concentrated liquid desiccant to distributor 14 of absorber 12. The partially heated dilute liquid desiccant flows through a manifold 84 to the condenser. During this stage, the dilute liquid desiccant dispensed from absorber 12 is raised to a first temperature. As discussed above with respect to coiled interchange heat exchanger 58, the inner tubes 70 may be fabricated from TEFLON and the outer tubes 72 may be constructed from silicone rubber. Likewise, the inner tubes may be provided with a convoluted or corrugated profile as shown in FIGS. 12A and 12B, respectively.

The partially heated liquid desiccant at the first temperature is delivered to a condenser 86 from split interchange heat exchanger 66 as shown in FIGS. 8 and 8A. Referring now to FIGS. 13 and 14, there is depicted a first embodiment of condenser 86, which is comprised of an inner shell 88 disposed within an outer housing 90 defining at least one chamber 92 between inner shell 88 and housing 90. The housing 90 includes a plurality of side walls 94, a top wall 96 and a bottom wall 98. A pair of steam tubes 100 communicate with inner shell 88 through top wall 96 to deliver steam from boiler 34. A pair of air vents 102 likewise communicate with chamber 92 through top wall 96 to evacuate excess air therefrom. A condensate tube 104 communicates with inner shell 88 through bottom wall 98 to drain condensate into a condensate pan 106 (see FIG. 8A). An inlet tube 108 communicates with chamber 92 through one of the side walls 94 to deliver partially heated dilute desiccant to condenser 86 from split interchange heat exchanger 66. An outlet tube 110 is similarly disposed to communicate with chamber 92 on an opposite side of condenser 86 to deliver dilute desiccant which is sensibly heated to a second temperature by the latent heat of condensation as the steam condenses in the inner shell 88, to the coiled interchange heat exchanger 58 via the inlet port 54 of U-fitting 52 shown in FIGS. 8 and 11. A fraction of the desiccant flow leaving the condenser may be recirculated to the desiccant absorber 12. This reduces the flow rate to the boiler 34 to lower heat loss and increase energy efficiency. In addition, this maintains a relatively high flow through the absorber 12 and condenser 86 to yield a higher absorption and condensation capacity. To facilitate heat transfer, inner shell 88 is fabricated from materials including inconel, monel, titanium, TEFLON, TEFLON-coated copper, TEFLON-coated aluminum, and TEFLON-coated stainless steel. The housing 90 is fabricated from materials including TEFLON, polycarbonate, polyvinylidene fluoride, polypropylene, silicone rubber, polyethylene, and polystyrene. If a plastic such as TEFLON is used for the housing 90, the wall thickness is made suitably thick to provide the necessary insulating properties.

The condenser 86 may incorporate a plurality of fins 112 located on the exterior of inner shell 88 and a plurality of fins 114 disposed on bottom wall 98 of housing 90. The inner shell 88 may be provided with a plurality of baffles 116 to prevent short circuiting from steam inlets 100 to condensate outlet 104.

Although depicted with the steam being directed into the inner shell 88 and the liquid desiccant being directed into the chamber 92, the opposite arrangement may be employed with the liquid desiccant directed into the inner shell 88 and the steam delivered to the chamber 92. Referring now to FIG. 15, there is shown an alternative embodiment of a condenser 86*a*, including a housing 90*a* and inner shell 88*a*, where the inner shell 88*a* segregates housing 90*a* into two compartments 92*a*, 92*b*, respectively. A steam inlet tube 100*a* communicates with compartment 92*a*, and a steam inlet tube 100*b* communicates with compartment 92*b*. Partially heated dilute desiccant solution is delivered to inner shell 88*a* through solution inlet 108*a*, and is sensibly heated by the latent heat of condensation as the steam condenses in the respective chambers 92*a*, 92*b*. Condensate flows out of chambers 92*a*, 92*b*, via condensate outlets 104*a*, 104*b*, respectively. Partially heated dilute desiccant at the second temperature flows out of inner shell 88a through solution outlet 110a to coiled interchange heat exchanger 58. Baffles 112a, 112b are provided in chambers 92a, 92b, respectively.

Referring now to FIG. 16, there is shown a third embodiment of a condenser 86b, comprising a housing 90b and a plurality of tubes 118, which may be convoluted or corrugated as described above with regard to the interchange heat exchangers and shown in FIGS. 12A and 12B. The tubes 118 are supported by opposing support plates 120 and communicate with respective steam inlets 100c, 100d through which steam is delivered from boiler 34. The housing 90b includes a liquid desiccant solution inlet 108b to receive dilute liquid desiccant from split interchange heat exchanger 66, and an outlet 110b to deliver partially heated liquid desiccant at the second temperature to the coiled interchange heat exchanger 58. The tubes 118 are fabricated from TEFLON, and the support plates 120 include at least one silicone rubber sheet attached thereto.

Referring now to FIG. 17, there is shown another embodiment of a condenser 86c, utilizing multiple double-pipe heat exchangers. Each double-pipe heat exchanger comprises an outer straight tube 300 and an inner convoluted tube 302 concentrically disposed within the outer tube. A small annular gap is defined between the outer and inner tubes 300, 302 which forces the fluid to follow a "screw-like" tortuous path through the convolutions at high velocity. This arrangement provides high heat transfer coefficients and condensation capacity. The components can be fabricated from plastics such as polypropylene, TEFLON, PVDF or silicone rubber. Dilute liquid desiccant from split Interchange heat exchanger 66 is directed into a manifold 304. Similarly, steam from boiler 34 flows into a manifold 306 through inlet ports 308. Manifold 304 communicates with the inner convoluted tubes 302. Steam flows through the annuli formed between outer tubes 308 and inner tubes 302, causing the dilute liquid desiccant entering the heat exchangers from manifold 304 to be partially heated to the second temperature. This heated liquid desiccant is delivered to the coiled interchange heat exchanger 58 from exit manifold 310. Condensate is collected in manifold 312, and is then delivered to pan 106. Air vents are utilized to ensure reliable gravity assisted drain flow of the liquid desiccant from the absorber 12 to the boiler 34. In a preferred embodiment, small pieces of TEFLON tape having a micro-pore structure can be used in the vent assembly. The TEFLON material is hydrophobic and has a micro-pore structure which enables the free passage of air while preventing steam or desiccant leakage. The air vent 314 comprises a tube 316 extending upwardly from manifold 310. The tube 316 includes a polypropylene mesh 318 and a piece of TEFLON tape 320 in a laminated structure. Alternatively, conventional float-based air vents, such as air vents manufactured by Honeywell, can be utilized to vent air from the system.

Referring now to FIG. 18, in another embodiment the condenser 86d comprises multiple coiled double pipe heat exchangers. Each double pipe heat exchanger includes an outer straight tube 300a and inner convoluted tube 302a concentrically disposed within the outer tube 300a Steam from boiler 34 enters a manifold 306a, from where it is communicated into the annuli formed between outer tubes 300a and inner tubes 302a. Dilute liquid desiccant is delivered to manifold 304a and thence into the inner tubes 302a. Partially heated liquid desiccant exits into manifold 310a, and is delivered to coiled Interchange heat exchanger 58. Condensate flows through outlets 312a to pan 106. This condenser 86d, operates on the same principles and offers the same advantages as the double-pipe condenser 86c described above.

Referring now to FIG. 20, the respective components of the LDA are shown stacked within frame 35 (the components of the absorption air conditioner 202 are not shown).

During the operating cycle, ambient air is drawn into the unit, through absorber 12 and exhausted to the room by fan 23. The moisture in the air is extracted as the air makes contact with the liquid desiccant wicking across the microglass fiber wick plates 20, 22. Dilute liquid desiccant is gravity fed from drain pan 24 of absorber 12 to manifold 76 of split interchange heat exchanger 66, wherein it is raised to a first temperature through heat transfer from concentrated liquid desiccant flowing through annuli 74. The dilute liquid desiccant at the first temperature is then delivered to the condenser 86, in which the latent heat of condensation as the steam condenses sensibly heats the liquid desiccant to the second temperature. The liquid desiccant at the second temperature is thereafter delivered to the coiled interchange heat exchanger 58 in which it is further heated to a third temperature prior to introduction into boiler 34 for regeneration. The coiled interchange heat exchanger 58 recovers waste heat radiating from the walls 36 of boiler 34. The concentrated liquid desiccant solution produced by boiling the liquid desiccant is drawn through the coiled interchange heat exchanger 58 and split interchange heat exchanger 66, and thereafter delivered to distributor 14 of absorber 12 by pump 80. The stacking of the respective components as shown in FIG. 8 provides for the gravity feed of dilute liquid desiccant from absorber 12 to boiler 34 through the first and second heat exchangers and the condenser, thereby eliminating the need for multiple pumps in the system.

The present invention has been shown and described in what are considered to be the most practical and preferred embodiments. It is anticipated, however, that departures can be made therefrom and that obvious modifications will be implemented by persons skilled in the art.

What is claimed is:

1. A liquid desiccant air conditioner, comprising, in combination, a dehumidifier including a liquid desiccant absorber for absorbing moisture contained in ambient air entering the dehumidifier and passing through said desiccant absorber, said desiccant absorber being constructed and arranged for receiving concentrated liquid desiccant and dispensing dilute liquid desiccant;

a boiler operative at or greater than atmospheric pressure to boil dilute liquid desiccant to evaporate moisture and thereby reconstitute the liquid desiccant into concentrated liquid desiccant;

a first condenser fluidly communicating with said boiler to receive steam generated by boiling liquid desiccant in said boiler, said first condenser further fluidly communicating with said absorber to receive dilute liquid desiccant from said absorber, said first condenser being operable to sensibly heat the dilute liquid desiccant therein by recovering the latent heat of condensation as steam delivered from said boiler is condensed, to preheat said dilute liquid desiccant prior to delivery to said boiler;

a second condenser;

an evaporator through which a refrigerant is passed to effect cooling of dehumidified ambient air from said desiccant absorber passing through said evaporator and create vaporized refrigerant;

a refrigerant absorber fluidly communicating with said evaporator to receive vaporized refrigerant from said evaporator, said refrigerant absorber containing an absorbent for absorbing the vaporized refrigerant;

a regenerator for separating refrigerant from the absorbent, said regenerator fluidly communicating with said second condenser to supply separated refrigerant to said second condenser, said regenerator fluidly communicating with said refrigerant absorber to receive a solution of absorbent and refrigerant from said refrigerant absorber and return absorbent from said regenerator to said refrigerant absorber, said regenerator fluidly communicating with said boiler to receive steam from said boiler as a heat input; and a pump for pumping the solution of absorbent and refrigerant from said refrigerant absorber to said regenerator.

2. The liquid desiccant air conditioner recited in claim 1, further comprising a heat exchanger fluidly communicating with said desiccant absorber, said condenser and said boiler, said heat exchanger being operable to transfer heat from the concentrated liquid desiccant directed to said heat exchanger from said boiler to the dilute liquid desiccant directed to said heat exchanger from said desiccant absorber, and to deliver preheated dilute liquid desiccant to said condenser, wherein said condenser further preheats said dilute liquid desiccant prior to delivery to said boiler.

3. The liquid desiccant air conditioner recited in claim 2, wherein said heat exchanger comprises at least one tube assembly including an inner tube concentrically disposed within an outer tube to define an annulus therebetween.

4. The liquid desiccant air conditioner recited in claim 3, wherein dilute liquid desiccant from said desiccant absorber is passed through said inner tube, and concentrated liquid desiccant is passed through said annulus.

5. The liquid desiccant air conditioner recited in claim 3, wherein dilute liquid desiccant from said desiccant absorber is passed through said annulus, and concentrated liquid desiccant is passed through said inner tube.

6. The liquid desiccant air conditioner recited in claim 3, wherein said inner tube is fabricated from TEFLON, and said outer tube is fabricated from silicone rubber.

7. The liquid desiccant air conditioner recited in claim 2, wherein said heat exchanger comprises at least one tube assembly including an inner tube fabricated from TEFLON concentrically disposed within an outer tube fabricated from silicone rubber to define an annulus therebetween.

8. The liquid desiccant air conditioner recited in claim 1, further comprising a heat exchanger fluidly communicating with said condenser, said boiler and said desiccant absorber, said heat exchanger operable to transfer heat from concentrated liquid desiccant directed to said heat exchanger from said boiler to the preheated dilute liquid desiccant directed to said heat exchanger from said condenser to further preheat the dilute liquid desiccant prior to delivery to said boiler, said heat exchanger being disposed with respect to said boiler to recover waste heat from said boiler.

9. The liquid desiccant air conditioner recited in claim 1, wherein said desiccant absorber includes a top and a bottom and comprises: a plurality of horizontally and vertically disposed interconnected microglass fiber plates; a distributor disposed above said fiber plates at said top of said desiccant absorber for introducing the concentrated desiccant into said desiccant absorber; and a drain pan for collecting the dilute desiccant disposed at said bottom of said desiccant absorber.

10. The liquid desiccant air conditioner recited in claim 1, wherein said desiccant absorber includes a plurality of absorber pads disposed side-by-side, said desiccant absorber further comprising a top distributor pan for distributing liquid desiccant to a top side of said pads, and a drain pan for collecting dilute liquid desiccant from a bottom side of said pads, said absorber pads being connected together at least adjacent upper ends thereof so as to substantially prevent liquid desiccant from passing downwardly between said pads.

11. The liquid desiccant air conditioner recited in claim 1, wherein said boiler includes an inner vessel and an outer vessel, a heating element disposed in said inner vessel, and a pipe communicating heated liquid desiccant from said inner vessel and disposed within said outer vessel, whereby liquid desiccant is returned to said outer vessel from said condenser and is heated in said outer vessel by hot liquid desiccant passing through said pipe prior to entering said inner vessel.

12. The liquid desiccant air conditioner recited in claim 1, wherein said condenser comprises an inner shell disposed within an outer housing defining at least one chamber between said inner shell and said housing.

13. The liquid desiccant air conditioner recited in claim 12, wherein said inner shell is fabricated from materials selected from the group of inconel, monel, titanium, TEFLON, TEFLON-coated copper, TEFLON-coated aluminum, and TEFLON-coated stainless steel; and said outer shell is fabricated from materials selected from the group of TEFLON, polycarbonate, polyvinylidene fluoride, polypropylene, silicone rubber, polyethylene, and polystyrene.

14. The liquid desiccant air conditioner recited in claim 12, wherein said condenser further comprises at least one steam inlet communicating steam from said boiler with said at least one chamber and at least one solution inlet communicating dilute liquid desiccant with said inner shell.

15. The liquid desiccant air conditioner recited in claim 12, wherein said condenser further comprises at least one steam inlet communicating steam from said boiler with said inner shell and at least one solution inlet communicating dilute liquid desiccant with said at least one chamber.

16. The liquid desiccant air conditioner recited in claim 12, wherein said inner shell divides said housing into two separate compartments, each compartment having a steam inlet and a condensate outlet, said housing further comprising a plurality of baffles to prevent short circuiting from said steam inlets to said condensate outlets.

17. The liquid desiccant air conditioner recited in claim 1, wherein said condenser comprises a housing and a plurality of tubes, said tubes being supported by opposing support plates, said tubes communicating with a steam inlet to receive steam from said boiler, said housing including a solution inlet to receive dilute liquid desiccant.

18. The liquid desiccant air conditioner recited in claim 17, wherein said tubes are at least one of convoluted and corrugated.

19. The liquid desiccant air conditioner recited in claim 17, wherein said tubes are fabricated from TEFLON, and said support plates include at least one silicone rubber sheet attached thereto.

20. The liquid desiccant air conditioner recited in claim 1, wherein said condenser comprises at least one tube assembly including an inner tube defining a first flow passageway and an outer tube, said inner tube being disposed within said outer tube to define an annular second flow passageway therebetween, wherein liquid desiccant is communicated through a first of said flow passageways and steam is communicated through a second of said flow passageways.

21. The liquid desiccant air conditioner recited in claim 20, wherein said inner tube is at least one of convoluted and corrugated.

22. The liquid desiccant air conditioner recited in claim 20, wherein said tube assembly is coiled.

23. The liquid desiccant air conditioner recited in claim 1, further comprising a frame fabricated from materials selected from the group of polypropylene, polyethylene, TEFLON, polyvinylidene fluoride, polycarbonate, PVC and polystyrene.

24. The liquid desiccant air conditioner recited in claim 1, wherein said liquid desiccant is selected from the group of aqueous LiCl, LiBr and $CaCl_2$.

25. The liquid desiccant air conditioner recited in claim 1, wherein said boiler includes a vessel fabricated from plastic.

26. The liquid desiccant air conditioner recited in claim 25, wherein said plastic is selected from the group of TEFLON, polycarbonate, fiber glass and polyvinylidene fluoride.

27. The liquid desiccant air conditioner recited in claim 1, further comprising means for pumping concentrated liquid desiccant into said desiccant absorber.

28. The liquid desiccant air conditioner recited in claim 1, wherein a fraction of the liquid desiccant leaving said first condenser is recirculated to said liquid desiccant absorber.

29. A liquid desiccant air conditioner, comprising:
- a dehumidifier including a liquid desiccant absorber for absorbing moisture contained in ambient air entering the dehumidifier and passing through said desiccant absorber, said desiccant absorber being constructed and arranged for receiving concentrated liquid desiccant and dispensing dilute liquid desiccant,
- a boiler for boiling dilute liquid desiccant from said absorber at or greater than atmospheric pressure to evaporate moisture to reconstitute the liquid desiccant into concentrated liquid desiccant;
- a first heat exchanger operable to transfer heat from the concentrated liquid desiccant to the dilute liquid desiccant directed to said first heat exchanger from said desiccant absorber to raise the temperature of the dilute liquid desiccant to a first temperature;
- a first condenser fluidly communicating with said boiler to receive steam generated by boiling liquid desiccant in said boiler, said first condenser further fluidly communicating with said first heat exchanger to receive partially heated dilute liquid desiccant from said first heat exchanger at said first temperature, said first condenser being operable to sensibly heat the dilute liquid desiccant therein to a second temperature by recovering the latent heat of condensation as steam delivered from said boiler is condensed;
- a second heat exchanger fluidly communicating with said first condenser, said boiler and said first heat exchanger, said second heat exchanger operable to transfer heat from concentrated liquid desiccant directed to said second heat exchanger from said boiler to the dilute liquid desiccant directed to said second heat exchanger from said first condenser at said second temperature to raise the temperature of the dilute liquid desiccant to a third temperature, said dilute liquid desiccant at the third temperature being directed to said boiler and said concentrated liquid desiccant being directed to said first heat exchanger, said second heat exchanger being disposed with respect to said boiler to recover waste heat from said boiler; and
- a pump for pumping concentrated liquid desiccant into said absorber;
- a second condenser;
- an evaporator through which a refrigerant is passed to effect cooling of dehumidified ambient air from said desiccant absorber passing through said evaporator;
- a refrigerant absorber fluidly communicating with said evaporator to receive vaporized refrigerant from said evaporator, said refrigerant absorber containing an absorbent for absorbing the vaporized refrigerant;
- a regenerator for separating refrigerant from the absorbent, said regenerator fluidly communicating with said second condenser to supply separated refrigerant to said second condenser, said regenerator fluidly communicating with said refrigerant absorber to receive a solution of absorbent and refrigerant from said refrigerant absorber and return absorbent from said regenerator to said refrigerant absorber, said regenerator fluidly communicating with said boiler to receive steam from said boiler as a heat input; and
- a pump for pumping the solution of absorbent and refrigerant from said refrigerant absorber to said regenerator.

30. A liquid desiccant air conditioner, comprising:
- a dehumidifier including a liquid desiccant absorber for absorbing moisture contained in ambient air entering the dehumidifier and passing through said desiccant absorber, said desiccant absorber constructed and arranged for receiving concentrated liquid desiccant and dispensing dilute liquid desiccant;
- a boiler for boiling partially preheated dilute liquid desiccant to evaporate moisture to reconstitute the liquid desiccant into concentrated liquid desiccant;
- a first condenser fluidly communicating with said boiler to receive steam generated by boiling liquid desiccant in said boiler, said first condenser further fluidly communicating with said absorber to receive dilute liquid desiccant from said absorber, said first condenser being operable to sensibly heat the dilute liquid desiccant therein by recovering the latent heat of condensation as steam delivered from said boiler is condensed, to preheat said dilute liquid desiccant prior to delivery to said boiler;
- a heat exchanger fluidly communicating with said first condenser, said boiler and said desiccant absorber, said heat exchanger being operable to transfer heat from concentrated liquid desiccant received from said boiler to the preheated dilute liquid desiccant directed to said heat exchanger from said first condenser to further preheat the dilute liquid desiccant prior to delivery to said boiler, said heat exchanger including at least one tube assembly including an inner tube concentrically disposed within an outer tube to define an annulus therebetween, said at least one tube assembly being coiled around said boiler to recover waste heat from said boiler,
- a second condenser;
- an evaporator through which a refrigerant is passed to effect cooling of dehumidified ambient air from said desiccant absorber passing through said evaporator;
- an expansion valve disposed between said second condenser and said evaporator;
- a refrigerant absorber fluidly communicating with said evaporator to receive vaporized refrigerant from said evaporator, said refrigerant absorber containing an absorbent for absorbing the vaporized refrigerant;
- a regenerator for separating refrigerant from the absorbent, said regenerator fluidly communicating with said second condenser to supply separated refrigerant to said second condenser, said regenerator fluidly communicating with said refrigerant absorber to receive a solution of absorbent and refrigerant from said refrigerant absorber and return absorbent from said regenerator to said refrigerant absorber, said regenerator fluidly communicating with said boiler to receive steam from said boiler as a heat input; and a pump for pumping the solution of absorbent and refrigerant from said refrigerant absorber to said regenerator.

31. The liquid desiccant air conditioner recited in claim 30, wherein dilute liquid desiccant from said condenser is passed through said inner tube, and concentrated liquid desiccant from said boiler is passed through said annulus.

32. The liquid desiccant air conditioner recited in claim 30, wherein dilute liquid desiccant from said condenser is passed through said annulus, and concentrated liquid desiccant from said boiler is passed through said inner tube.

33. The liquid desiccant air conditioner recited in claim 30, wherein said inner tube is fabricated from TEFLON, and said outer tube is fabricated from silicone rubber.

34. The liquid desiccant air conditioner recited in claim 30, further comprising an air vent.

35. The liquid desiccant air conditioner recited in claim 34, wherein said air vent comprises TEFLON tape.

36. The liquid desiccant air conditioner recited in claim 34, wherein said air vent is a float-type air vent.

37. A liquid desiccant air conditioner, comprising:
 a dehumidifier including a liquid desiccant absorber for absorbing moisture contained in ambient air entering the dehumidifier and passing through said desiccant absorber, said desiccant absorber constructed and arranged for receiving concentrated liquid desiccant and dispensing dilute liquid desiccant;
 a boiler for boiling partially preheated dilute liquid desiccant to evaporate moisture to reconstitute the liquid desiccant into concentrated liquid desiccant;
 a first condenser fluidly communicating with said boiler to receive steam generated by boiling liquid desiccant in said boiler, said first condenser further fluidly communicating with said absorber to receive dilute liquid desiccant from said absorber, said first condenser being operable to sensibly heat the dilute liquid desiccant therein by recovering the latent heat of condensation as steam delivered from said boiler is condensed, to preheat said dilute liquid desiccant prior to delivery to said boiler;
 a heat exchanger fluidly communicating with said first condenser, said boiler and said desiccant absorber, said heat exchanger comprising at least one tube assembly including an inner tube fabricated from Teflon concentrically within an outer tube fabricated from silicone rubber to define an annulus therebetween, said heat exchanger being operable to transfer heat from concentrated liquid desiccant received from said boiler to the preheated dilute liquid desiccant directed to said heat exchanger from said first condenser to further preheat the dilute liquid desiccant prior to delivery to said boiler, said heat exchanger being disposed with respect to said boiler to recover waste heat from said boiler;
 a second condenser;
 an evaporator through which a refrigerant is passed to effect cooling of dehumidified ambient air from said desiccant absorber passing through said evaporator;
 an expansion valve disposed between said second condenser and said evaporator;
 a refrigerant absorber fluidly communicating with said evaporator to receive vaporized refrigerant from said evaporator, said refrigerant absorber containing an absorbent for absorbing the vaporized refrigerant;
 a regenerator for separating refrigerant from the absorbent, said regenerator fluidly communicating with said second condenser to supply separated refrigerant to said second condenser, said regenerator fluidly communicating with said refrigerant absorber to receive a solution of absorbent and refrigerant from said refrigerant absorber and return absorbent from said regenerator to said refrigerant absorber, said regenerator fluidly communicating with said boiler to receive steam from said boiler as a heat input; and
 a pump for pumping the solution of absorbent and refrigerant from said refrigerant absorber to said regenerator.

38. A liquid desiccant air conditioner, comprising:
 a dehumidifier including a liquid desiccant absorber for absorbing moisture contained in ambient air entering the dehumidifier and passing through said desiccant absorber, said desiccant absorber constructed and arranged for receiving concentrated liquid desiccant and dispensing dilute liquid desiccant, said liquid desiccant comprising an aqueous solution including a mixture of at least two selected from a group including aqueous LiCl, LiBr and $CaCl_2$;
 a boiler for boiling partially preheated dilute liquid desiccant to evaporate moisture to reconstitute the liquid desiccant into concentrated liquid desiccant;
 a first condenser fluidly communicating with said boiler to receive steam generated by boiling liquid desiccant in said boiler, said first condenser further fluidly communicating with said absorber to receive dilute liquid desiccant from said absorber, said first condenser being operable to sensibly heat the dilute liquid desiccant therein by recovering the latent heat of condensation as steam delivered from said boiler is condensed, to preheat said dilute liquid desiccant prior to delivery to said boiler;
 a second condenser;
 an evaporator through which a refrigerant is passed to effect cooling of dehumidified ambient air from said desiccant absorber passing through said evaporator;
 a refrigerant absorber fluidly communicating with said evaporator to receive vaporized refrigerant from said evaporator, said refrigerant absorber containing an absorbent for absorbing the vaporized refrigerant;
 a regenerator for separating refrigerant from the absorbent, said regenerator fluidly communicating with said second condenser to supply separated refrigerant to said second condenser, said regenerator fluidly communicating with said refrigerant absorber to receive a solution of absorbent and refrigerant from said refrigerant absorber and return absorbent from said regenerator to said refrigerant absorber, said regenerator fluidly communicating with said boiler to receive steam from said boiler as a heat input; and
 a pump for pumping the solution of absorbent and refrigerant from said refrigerant absorber to said regenerator.

39. A liquid desiccant air conditioner, comprising in combination:
 a dehumidifier operative to receive air;
 a liquid desiccant absorber for absorbing moisture contained in ambient air entering the dehumidifier and passing through said desiccant absorber, said desiccant absorber constructed and arranged for receiving concentrated liquid desiccant and dispensing dilute liquid desiccant;
 an indirect evaporative cooler for receiving and cooling ambient air prior to the air entering the dehumidifier;

a boiler for boiling partially preheated dilute liquid desiccant to evaporate moisture to reconstitute the liquid desiccant into concentrated liquid desiccant;

a first condenser fluidly communicating with said boiler to receive steam generated by boiling liquid desiccant in said boiler, said first condenser further fluidly communicating with said absorber to receive dilute liquid desiccant from said absorber, said first condenser being operable to sensibly heat the dilute liquid desiccant therein by recovering the latent heat of condensation as steam delivered from said boiler is condensed, to preheat said dilute liquid desiccant prior to delivery to said boiler;

a second condenser;

an evaporator through which a refrigerant is passed to effect cooling of dehumidified ambient air from said desiccant absorber passing through said evaporator;

an expansion valve disposed between said second condenser and said evaporator;

a refrigerant absorber fluidly communicating with said evaporator to receive vaporized refrigerant from said evaporator, said refrigerant absorber containing an absorbent for absorbing the vaporized refrigerant;

a regenerator for separating refrigerant from the absorbent, said regenerator fluidly communicating with said second condenser to supply separated refrigerant to said second condenser, said regenerator fluidly communicating with said refrigerant absorber to receive a solution of absorbent and refrigerant from said refrigerant absorber and return absorbent from said regenerator to said refrigerant absorber, said regenerator fluidly communicating with said boiler to receive steam from said boiler as a heat input; and a pump for pumping the solution of absorbent and refrigerant from said refrigerant absorber to said regenerator.

40. The liquid desiccant air conditioner recited in claim 39, further comprising a direct evaporative cooler for further cooling the air cooled by said evaporator.

41. The liquid desiccant air conditioner recited in claim 40, wherein at least a fraction of water supplied to said direct evaporative cooler is obtained from condensate produced in at least one of said first condenser and said regenerator.

42. The liquid desiccant air conditioner recited in claim 39, wherein at least a fraction of water supplied to said indirect evaporative cooler is obtained from condensate produced in at least one of said first condenser and said regenerator.

43. A liquid desiccant air conditioner, comprising in combination:

a dehumidifier operative to receive air;

a liquid desiccant absorber for absorbing moisture contained in ambient air entering the dehumidifier and passing through said desiccant absorber, said desiccant absorber constructed and arranged for receiving concentrated liquid desiccant and dispensing dilute liquid desiccant;

a boiler for boiling partially preheated dilute liquid desiccant to evaporate moisture to reconstitute the liquid desiccant into concentrated liquid desiccant;

a first condenser fluidly communicating with said boiler to receive steam generated by boiling liquid desiccant in said boiler, said first condenser further fluidly communicating with said absorber to receive dilute liquid desiccant from said absorber, said first condenser being operable to sensibly heat the dilute liquid desiccant therein by recovering the latent heat of condensation as steam delivered from said boiler is condensed, to preheat said dilute liquid desiccant prior to delivery to said boiler;

a second condenser;

an evaporator through which a refrigerant is passed to effect cooling of dehumidified ambient air from said desiccant absorber passing through said evaporator;

a refrigerant absorber fluidly communicating with said evaporator to receive vaporized refrigerant from said evaporator, said refrigerant absorber containing an absorbent for absorbing the vaporized refrigerant;

a regenerator for separating refrigerant from the absorbent, said regenerator fluidly communicating with said second condenser to supply separated refrigerant to said second condenser, said regenerator fluidly communicating with said refrigerant absorber to receive a solution of absorbent and refrigerant from said refrigerant absorber and return absorbent from said regenerator to said refrigerant absorber, said regenerator fluidly communicating with said boiler to receive steam from said boiler as heat input;

a pump for pumping the solution of absorbent and refrigerant from said refrigerant absorber to said regenerator; and a direct evaporative cooler for further cooling the air cooled by said evaporator.

44. A liquid desiccant air conditioner, comprising, in combination:

a dehumidifier including a liquid desiccant absorber for absorbing moisture contained in ambient air entering the dehumidifier and passing through said desiccant absorber, said desiccant absorber constructed and arranged for receiving concentrated liquid desiccant and dispensing dilute liquid desiccant;

a boiler for boiling partially preheated dilute liquid desiccant to evaporate moisture to reconstitute the liquid desiccant into concentrated liquid desiccant;

a first condenser fluidly communicating with said boiler to receive steam generated by boiling liquid desiccant in said boiler, said first condenser further fluidly communicating with said absorber to receive dilute liquid desiccant from said absorber, said first condenser being operable to sensibly heat the dilute liquid desiccant therein by recovering the latent heat of condensation as steam delivered from said boiler is condensed, to preheat said dilute liquid desiccant prior to delivery to said boiler;

a second condenser;

an evaporator through which a refrigerant is passed to effect cooling of dehumidified ambient air from said desiccant absorber passing through said evaporator;

an indirect evaporative cooler for cooling dehumidified air from said desiccant absorber prior to passing the dehumidified air through said evaporator;

an expansion valve disposed between said second condenser and said evaporator;

a refrigerant absorber fluidly communicating with said evaporator to receive vaporized refrigerant from said evaporator, said refrigerant absorber containing an absorbent for absorbing the vaporized refrigerant;

a regenerator for separating refrigerant from the absorbent, said regenerator fluidly communicating with said second condenser to supply separated refrigerant to said second condenser, said regenerator fluidly communicating with said refrigerant absorber to receive a solution of absorbent and refrigerant from said refrigerant absorber and return absorbent from said regenerator to said refrigerant absorber, said regenerator fluidly communicating with said boiler to receive steam from said boiler as a heat input; and a pump for pumping the solution of absorbent and refrigerant from said refrigerant absorber to said regenerator.

45. A liquid desiccant air conditioner, comprising, in combination, a dehumidifier including a liquid desiccant absorber for absorbing moisture contained in ambient air entering the dehumidifier and passing through said desiccant absorber, said desiccant absorber being constructed and arranged for receiving concentrated liquid desiccant and dispensing dilute liquid desiccant;

a boiler for boiling dilute liquid desiccant from said absorber to evaporate moisture and reconstitute the liquid desiccant into concentrated liquid desiccant;

a first condenser fluidly communicating with said boiler to receive steam generated by boiling liquid desiccant in said boiler, said first condenser further fluidly communicating with said absorber to receive dilute liquid desiccant from said absorber, said first condenser being operable to recover latent heat of condensation from said steam so as to sensibly heat said dilute liquid desiccant prior to entry into said boiler without significant direct exposure of said dilute liquid desiccant to air;

a second condenser;

an evaporator through which a refrigerant is passed to effect cooling of dehumidified ambient air from said desiccant absorber passing through said evaporator;

a refrigerant absorber fluidly communicating with said evaporator to receive vaporized refrigerant from said evaporator, said refrigerant absorber containing an absorbent for absorbing the vaporized refrigerant;

a regenerator for separating refrigerant from the absorbent, said regenerator fluidly communicating with said second condenser and being operative at atmospheric pressure to supply separated refrigerant to said second condenser, said regenerator fluidly communicating with said refrigerant absorber to receive a solution of absorbent and refrigerant from said refrigerant absorber at atmospheric pressure and return absorbent from said regenerator to said refrigerant absorber, said regenerator fluidly communicating with said boiler to receive steam from said boiler as a heat input; and a pump for pumping the solution of absorbent and refrigerant from said refrigerant absorber to said regenerator.

46. A liquid desiccant air conditioner, comprising in combination, a dehumidifier including a liquid desiccant absorber for absorbing moisture contained in ambient air entering the dehumidifier and passing through said desiccant absorber, said desiccant absorber being operative to receive concentrated liquid desiccant and dispense dilute liquid desiccant;

a boiler for boiling dilute liquid desiccant at or above atmospheric pressure to evaporate moisture and thereby reconstitute the liquid desiccant into concentrated liquid desiccant;

a first condenser fluidly communicating with said boiler and said desiccant absorber so as to receive steam generated by boiling liquid desiccant in said boiler and receive dilute liquid desiccant from said desiccant absorber, said first condenser being operative to sensibly heat the dilute liquid desiccant thereby by recovering the latent heat of condensation as steam delivered from said boiler is condensed, a second condenser;

an evaporator through which a refrigerant is passed to effect cooling of dehumidified ambient air from said desiccant absorber passing through said evaporator and create vaporized refrigerant;

a refrigerant absorber fluidly communicating with said evaporator to receive vaporized refrigerant from said evaporator, said refrigerant absorber containing an absorbent for absorbing the vaporized refrigerant;

a regenerator communicating with refrigerant absorber for separating refrigerant from said absorbent, said regenerator fluidly communicating with said boiler and said second condenser so as to receive steam from said boiler and supply separated refrigerant to said second condenser, said regenerator fluidly communicating with said refrigerant absorber to receive a solution of absorbent and refrigerant from said refrigerant absorber and return absorbent from said regenerator to said refrigerant absorber, said regenerator fluidly communicating with said boiler to receive heat input from said boiler; and a pump for pumping the solution of absorbent and refrigerant from said refrigerant absorber to said regenerator.

* * * * *